United States Patent
Kitazawa et al.

(10) Patent No.: US 8,699,718 B2
(45) Date of Patent: Apr. 15, 2014

(54) SOUND SIGNAL PROCESSING APPARATUS, MICROPHONE APPARATUS, SOUND SIGNAL PROCESSING METHOD, AND PROGRAM

(75) Inventors: Yuji Kitazawa, Saitama (JP); Kohei Asada, Kanagawa (JP)

(73) Assignee: Sony Corporation, Tokyo (JP)

( * ) Notice: Subject to any disclaimer, the term of this patent is extended or adjusted under 35 U.S.C. 154(b) by 332 days.

(21) Appl. No.: 13/115,224

(22) Filed: May 25, 2011

(65) Prior Publication Data
US 2011/0293102 A1 Dec. 1, 2011

(30) Foreign Application Priority Data
Jun. 1, 2010 (JP) .................................. 2010-125501

(51) Int. Cl.
*H04R 29/00* (2006.01)

(52) U.S. Cl.
USPC .............................. 381/56; 381/122; 381/71.6

(58) Field of Classification Search
USPC ................................ 381/91–92, 122, 56, 71.6
See application file for complete search history.

(56) References Cited

U.S. PATENT DOCUMENTS

| | | | |
|---|---|---|---|
| 8,477,955 B2* | 7/2013 | Engle et al. | 381/71.1 |
| 2008/0048878 A1* | 2/2008 | Boillot | 340/686.1 |
| 2008/0159568 A1 | 7/2008 | Asada et al. | |
| 2008/0234842 A1* | 9/2008 | Zhang | 700/83 |
| 2009/0046868 A1* | 2/2009 | Engle et al. | 381/74 |
| 2011/0249824 A1 | 10/2011 | Asada et al. | |
| 2011/0293107 A1 | 12/2011 | Kitazawa et al. | |
| 2012/0070018 A1* | 3/2012 | Grattan | 381/122 |

FOREIGN PATENT DOCUMENTS

| | | | |
|---|---|---|---|
| EP | 1 762 926 | * | 3/2006 |
| JP | 2000-235452 A | | 8/2000 |
| JP | 2008-166897 A | | 7/2008 |
| JP | 2009-134451 A | | 6/2009 |
| JP | 2009-217733 A | | 9/2009 |

* cited by examiner

*Primary Examiner* — Diser Paul
(74) *Attorney, Agent, or Firm* — Wolf, Greenfield & Sacks, P.C.

(57) ABSTRACT

A sound signal processing apparatus includes a sliding operation detecting section to which a sound signal collected by a microphone is inputted, and which determines start and end of a sliding operation by a determination process using a sliding sound signal component in the inputted sound signal, the sliding sound signal component being produced by the sliding operation on the microphone itself or its vicinity, and a control section that performs a predetermined control process that is set with respect to the sliding operation, during a period from the start to the end of the sliding operation determined by the sliding operation detecting section.

8 Claims, 22 Drawing Sheets

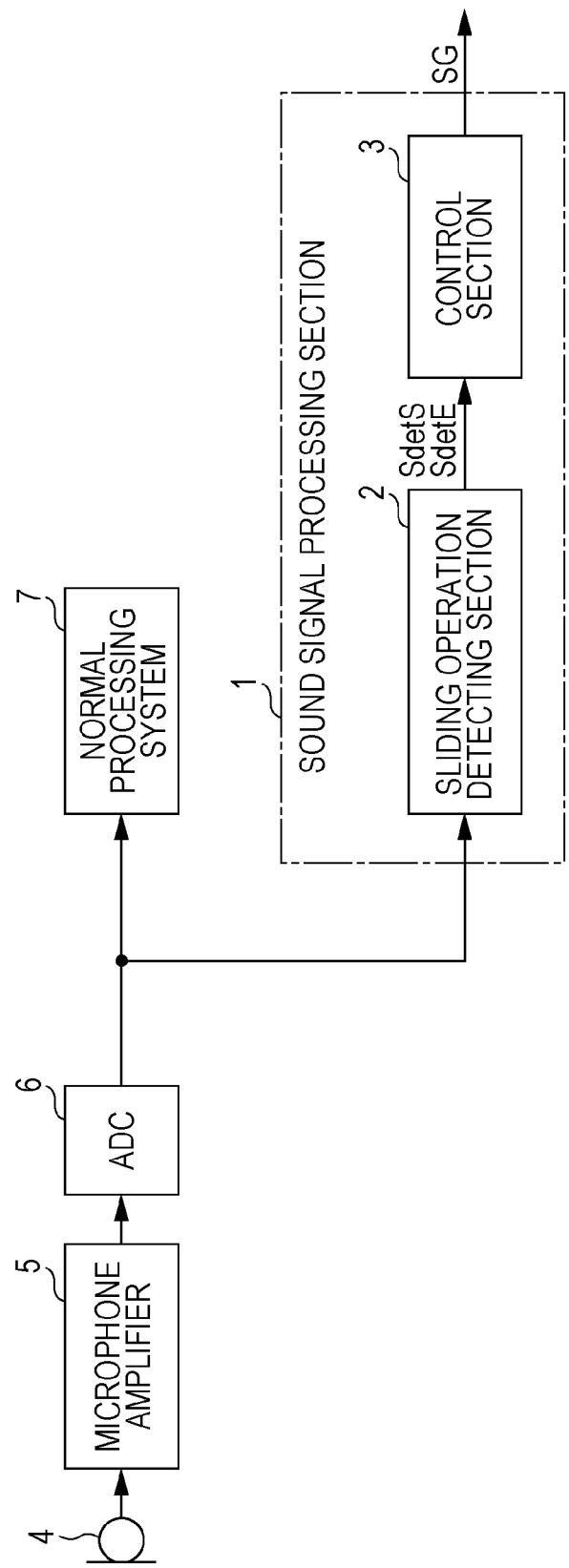

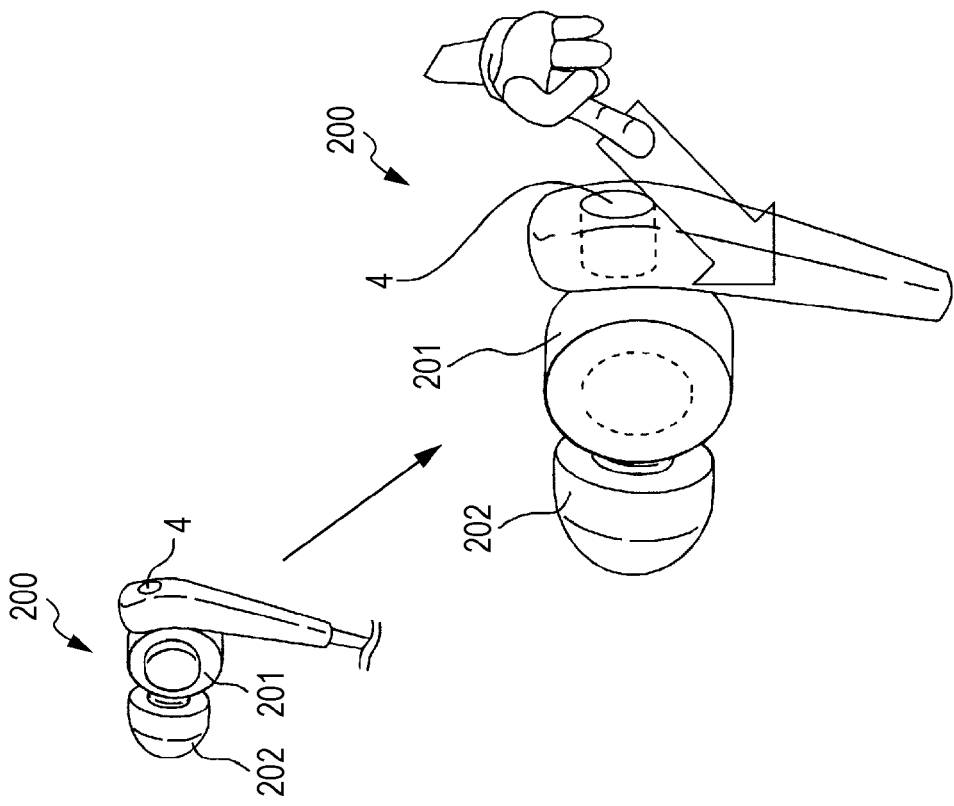
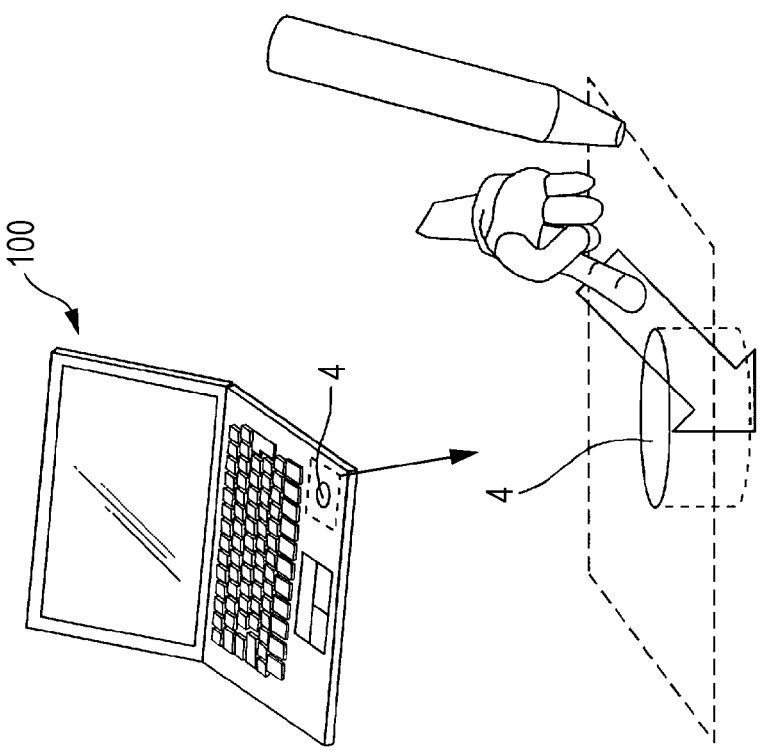

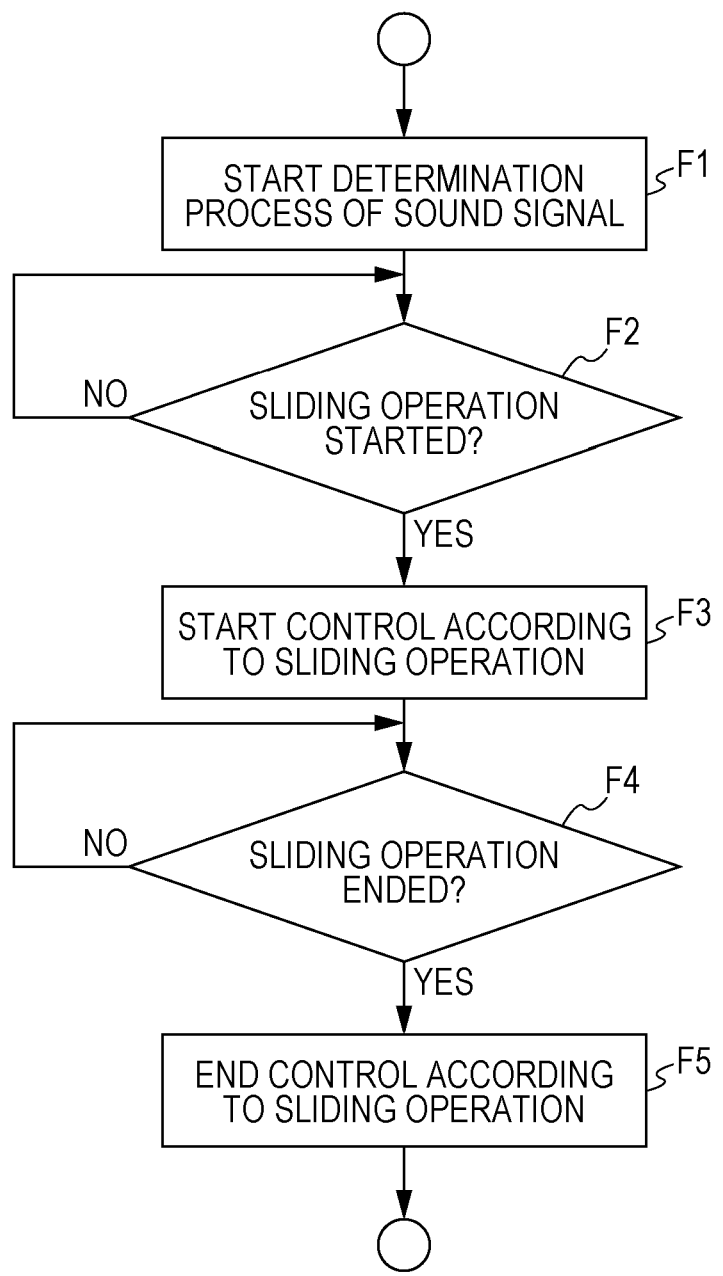

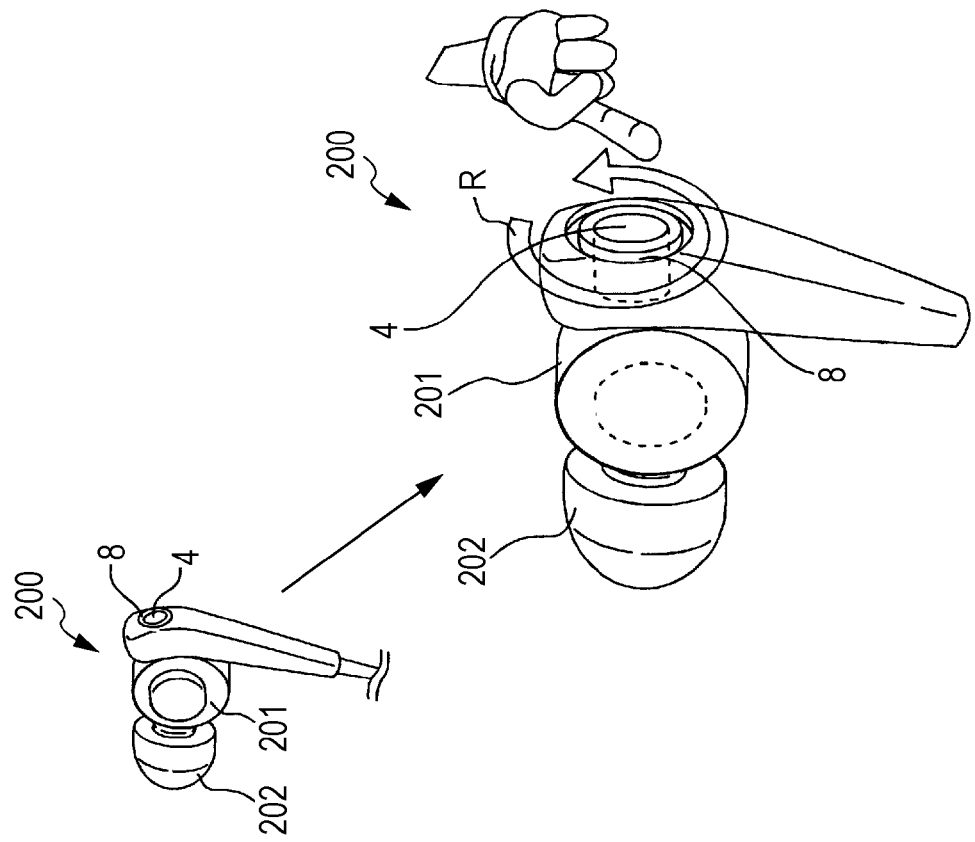
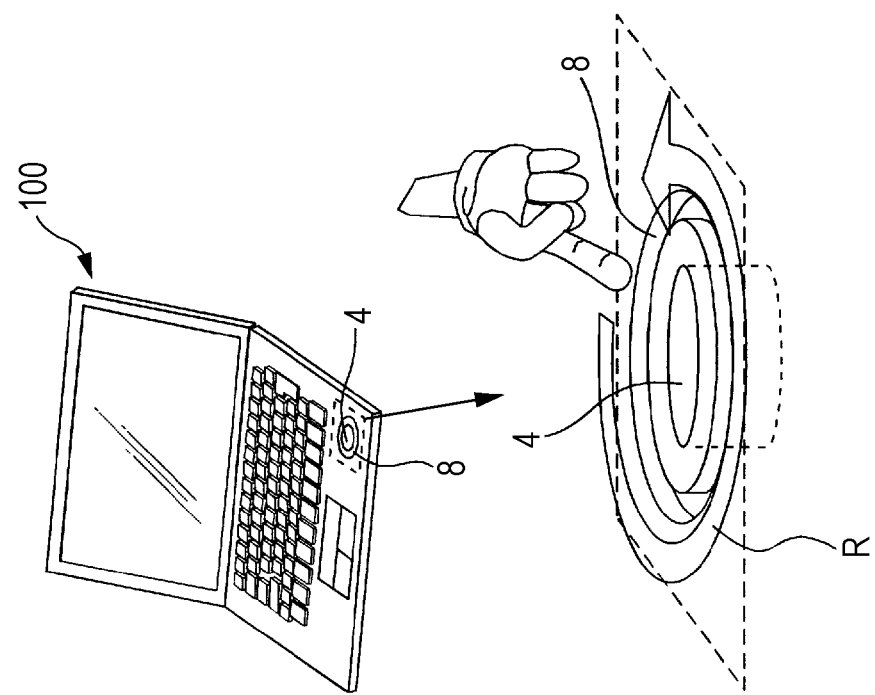

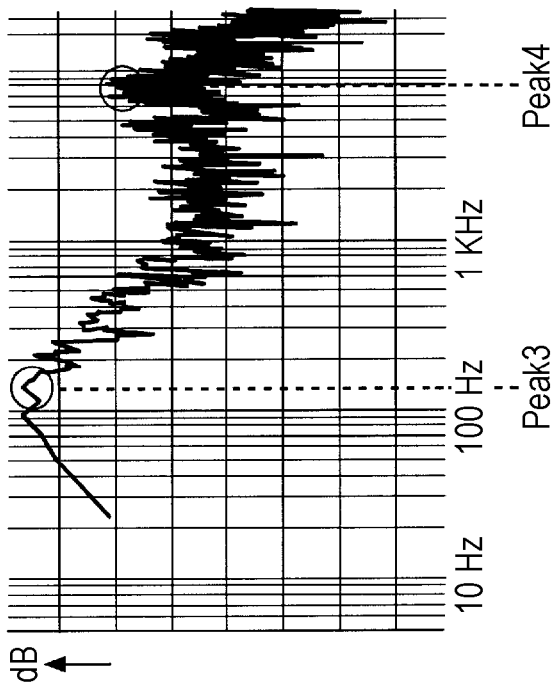
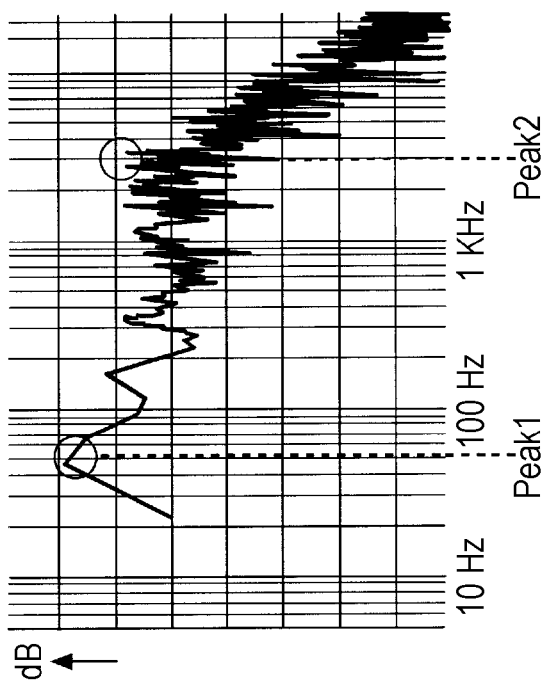

BPF fc3=50 Hz: EQUIVALENT TO Peak1 POSITION
⇒CORRESPONDING TO S1

BPF fc4=150 Hz: EQUIVALENT TO Peak2 POSITION
⇒CORRESPONDING TO S2

BPF fc5=3 KHz: EQUIVALENT TO Peak3 POSITION
⇒CORRESPONDING TO S3

BPF fc6=7 KHz: EQUIVALENT TO Peak4 POSITION
⇒CORRESPONDING TO S4

FIG. 20A
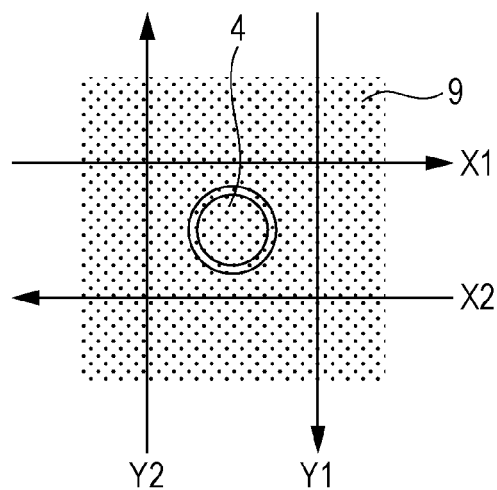
FIG. 20B
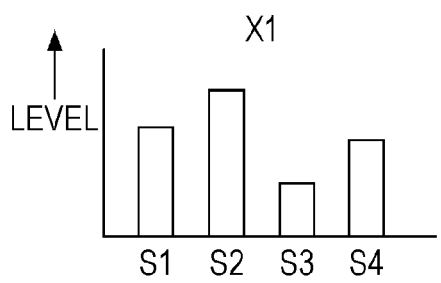 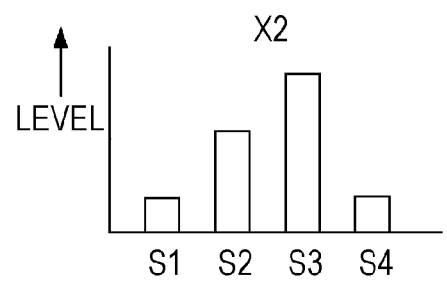
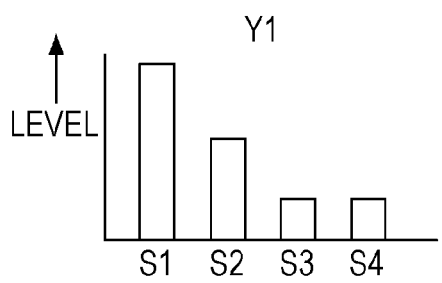 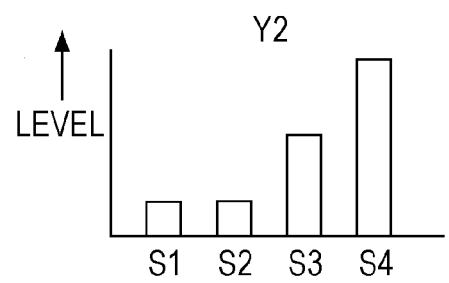

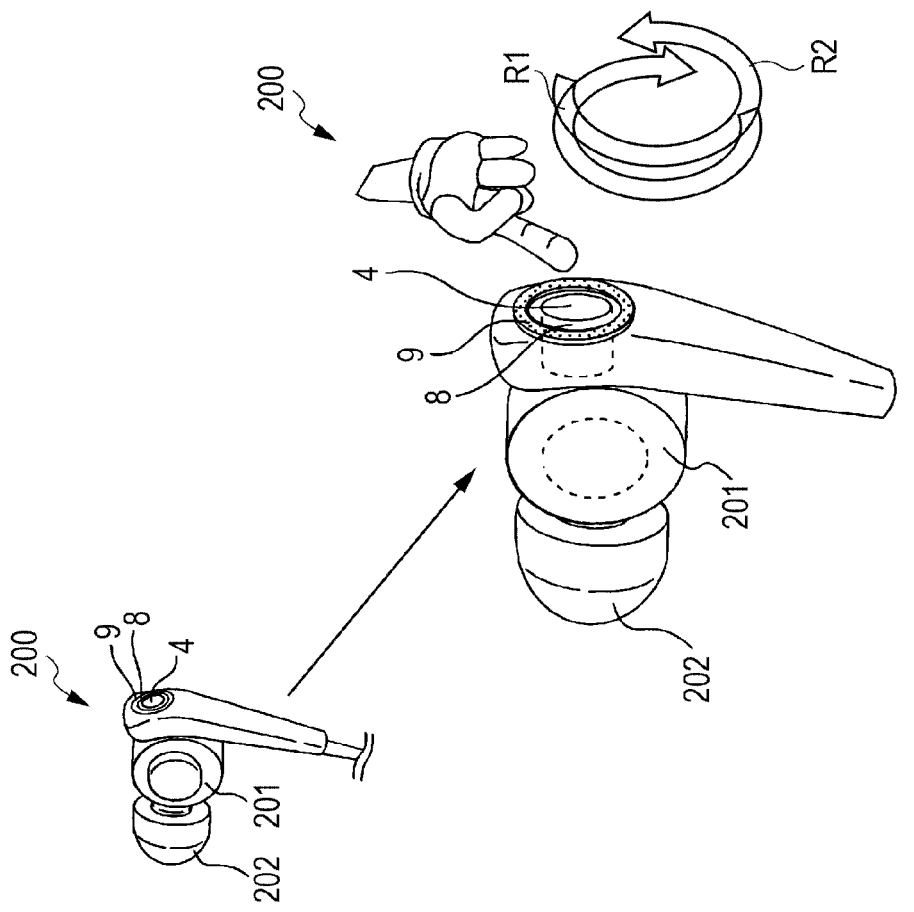
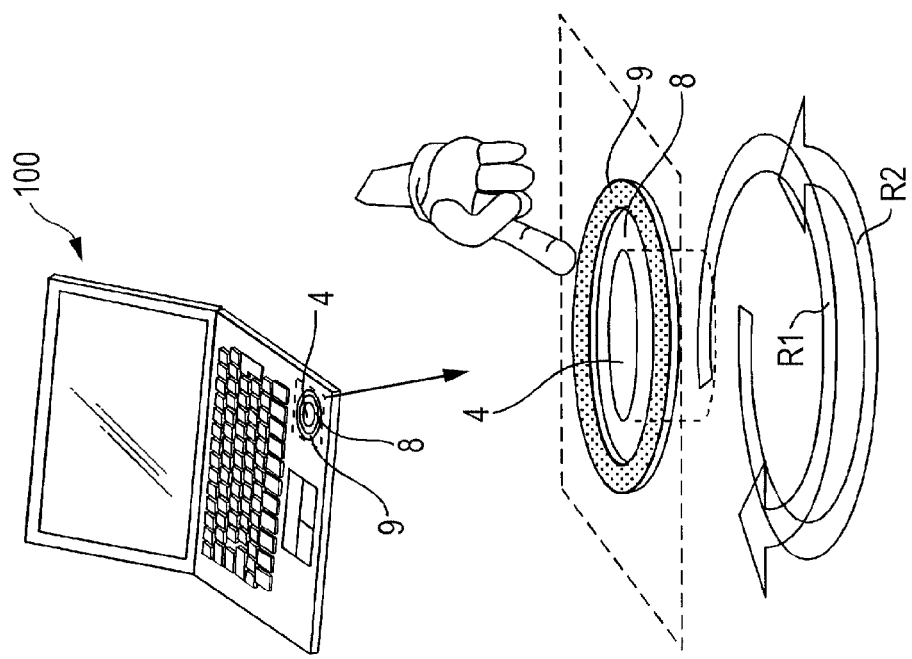

SOUND SIGNAL PROCESSING APPARATUS, MICROPHONE APPARATUS, SOUND SIGNAL PROCESSING METHOD, AND PROGRAM

BACKGROUND

The present disclosure relates to a sound signal processing apparatus and a sound signal processing method that detect a user operation input by a sound signal collected by a microphone. Also, the present disclosure relates to a program for implementing the sound signal processing apparatus and the sound signal processing method. Furthermore, the present disclosure relates to a microphone apparatus that supplies a sound signal to a sound signal processing apparatus.

In various kinds of electronic equipment, operating keys, a keyboard, a mouse, operating dials, a touch panel, and so on are used as devices for inputting user operations.

Usually, these operating devices are installed in accordance with the function of electronic equipment. On the other hand, depending on the function or usage of electronic equipment, it is desired to make the number of operating keys as small as possible, or enable easy-to-use, efficient operations.

Japanese Unexamined Patent Application Publication No. 2008-166897 mentioned above discloses a technique that uses a microphone as a device for operation input. The technique described in Japanese Unexamined Patent Application Publication No. 2008-166897 recognizes user's light tapping on the microphone and its vicinity with a finger or the like as an operation input. To this end, the waveform of a sound signal collected by the microphone when the user taps the microphone is recognized through a waveform correlation process.

SUMMARY

As in Japanese Unexamined Patent Application Publication No. 2008-166897 mentioned above, the ability to use a microphone also as an input device can contribute to reduced number of operating keys on the housing of equipment and improved operability.

For example, as an operation on a portable music player, suppose a case where a microphone is attached to the headphone portion worn by the user. The user usually puts the portable music player in a pocket of clothing, a bag, or the like. If the user is able to perform a predetermined operation by tapping the vicinity of the microphone in the headphone portion, this saves the user the trouble of taking the portable music player out.

On the other hand, since "tapping" is detected, although it is possible to do such an action equivalent to a gesture of "pressing a button once", for example, Play/Pause/Record/Power on/off, the above-mentioned technique is not suited for "operational gestures for which the time a button is being pressed is important".

For example, the above-mentioned technique is not suited for "an operation for performing fast forward during playback while pressing a button" as fast-forward playback, or an action such as "changing the playback pitch or playback speed while pressing a button".

In the case of operations for which an operation quantity is relevant, for example, Volume Up/Down, and "Advance" of a cursor or a selected portion of a menu, although tapping can be used to perform such operations, tapping is inconvenient in some cases. For example, tapping is inconvenient for the kind of operation for which an operating element such as a jog dial or a slide lever is suited.

For example, in the case of applying a tapping operation to Volume Up/Down, a conceivable mode of operation would be to turn the volume up (or down) by one step with each single tap. Then, to greatly raise (lower) the volume quickly, in the case of a tapping operation, it is necessary to perform tapping many times, making quick operation difficult. Moreover, the resulting operation is neither intuitive nor easy to use.

Although it is advantageous to use a microphone as an input device and allow operations to be given by tapping in the manner as described above, such an operation input mode is not appropriate for some kinds of operations, such as a continuous operation, and an operation for which an operation quantity is relevant.

It is desirable to enable even a continuous operation or an operation for which an operation quantity is specified, by using a microphone as an input device, thereby enabling effective use of an operation input mode using the microphone.

A sound signal processing apparatus according to an embodiment of the present disclosure includes a sliding operation detecting section to which a sound signal collected by a microphone is inputted, and which determines start and end of a sliding operation by a determination process using a sliding sound signal component in the inputted sound signal, the sliding sound signal component being produced by the sliding operation on the microphone itself or its vicinity, and a control section that performs a predetermined control process that is set with respect to the sliding operation, during a period from the start to the end of the sliding operation determined by the sliding operation detecting section.

Also, as the determination process, the sliding operation detecting section determines that the sliding operation has been started, when a time during which an energy level of the sliding sound signal component is equal to or higher than a first level has continued for a first time or more.

Further, as the determination process, the sliding operation detecting section determines that the sliding operation has been ended, when a time during which the energy level of the sliding sound signal component is lower than a second level has continued for a second time or more.

Also, the sliding operation detecting section performs the determination process by using a sliding sound signal component produced by a rotary sliding motion on the microphone itself or its vicinity with a finger or a sliding tool.

Also, a plurality of channels of sound signals are inputted to the sliding operation detecting section, and the sliding operation detecting section performs the determination process with respect to a sound signal obtained by adding the plurality of channels of sound signals to each other.

Alternatively, a plurality of channels of sound signals are inputted to the sliding operation detecting section, and the sliding operation detecting section performs the determination process with respect to each of the plurality of channels of sound signals, and determines the start and end of the sliding operation with respect to each of the channels.

Alternatively, a plurality of channels of sound signals are inputted to the sliding operation detecting section, and the sliding operation detecting section determines the start and the end of the sliding operation, and determines a channel on which the sliding operation has been performed, by performing a channel determination process which determines a channel that contains a sliding signal component from among the plurality of channels of sound signals, and the determination process with respect to a signal obtained by adding or subtracting sliding sound signal components from the plurality of channels to or from each other.

Also, the sliding operation detecting section further detects a sliding operation direction from the inputted sound signal, and the control section performs a predetermined control process that is set with respect to the sliding operation direction detected by the sliding operation detecting section, during the period from the start to the end of the sliding operation determined by the sliding operation detecting section.

Also, the sliding operation detecting section further detects a sliding operation location from the inputted sound signal, and the control section performs a predetermined control process that is set with respect to the sliding operation location detected by the sliding operation detecting section, during the period from the start to the end of the sliding operation determined by the sliding operation detecting section.

Also, the sound signal processing apparatus further includes a microphone, and a sound signal collected by the microphone is inputted to the sliding operation detecting section.

A microphone apparatus according to an embodiment of the present disclosure includes a microphone, and a sliding guide section that is formed in a vicinity of the microphone and guides a sliding operation position.

Also, a microphone apparatus according to an embodiment of the present disclosure includes a microphone, and a directional sound source section that is provided in a vicinity of the microphone, and produces different sound signal components depending on a sliding operation direction.

Also, a microphone apparatus according to an embodiment of the present disclosure includes a microphone, and a plurality of sliding sound source sections that are provided in a vicinity of the microphone, and produce different sound signal components when a sliding operation is performed.

A sound signal processing method according to an embodiment of the present disclosure includes determining start and end of a sliding operation by a determining process using a sliding sound signal component in a sound signal collected by a microphone, the sliding sound signal component being produced by the sliding operation on the microphone itself or its vicinity, and performing a predetermined control process that is set with respect to the sliding operation, during a period from the determined start to end of the sliding operation.

A program according to an embodiment of the present disclosure is a program for causing an arithmetic processing apparatus to execute the determination of the start and end of the sliding operation, and the predetermined control process.

The embodiments of the present disclosure as described above make it possible to detect an input operation that is continuous or has an operation quantity, while using a microphone for the input operation and through simple sound signal processing.

Thus, the user performs a predetermined operation as a sliding motion on the microphone or its vicinity with a finger or the like, that is, as an operation of keeping the finger or the like moving while touching the microphone or its vicinity in a tracing fashion.

In that case, the sound produced by the sliding motion is collected by the microphone. Thus, the sound signal inputted from the microphone to the sound signal processing apparatus contains the sound signal component of the sound produced by the sliding motion (sliding sound signal component). Accordingly, the start and end of the sliding operation are determined from the energy level or amplitude of the sliding sound signal component. Thus, a continuous operation or an operation quantity can be recognized from the duration of the sliding operation. That is, it is possible to recognize the sliding operation on the microphone or its vicinity as a continuous operation or an operation having an operation quantity, and perform the corresponding control process.

BRIEF DESCRIPTION OF THE DRAWINGS

FIG. 1 is a block diagram of the basic configuration according to an embodiment of the present disclosure;

FIGS. 2A and 2B are each an explanatory diagram of a sliding operation according to an embodiment of the present disclosure;

FIG. 3 is a flowchart of basic processing according to an embodiment of the present disclosure;

FIGS. 13A and 13B are each an explanatory diagram of a configuration including a sliding guide according to an embodiment;

FIGS. 18A and 18B are each an explanatory diagram of a frequency characteristic with respect to the sliding direction according to an embodiment;

FIGS. 20A and 20B are each an explanatory diagram of another example of sliding direction determination according to an embodiment;

FIGS. 21A and 21B are each an explanatory diagram of a configuration including a sliding guide and a directional sound source section according to an embodiment.

DETAILED DESCRIPTION OF EMBODIMENTS

Figure 4:
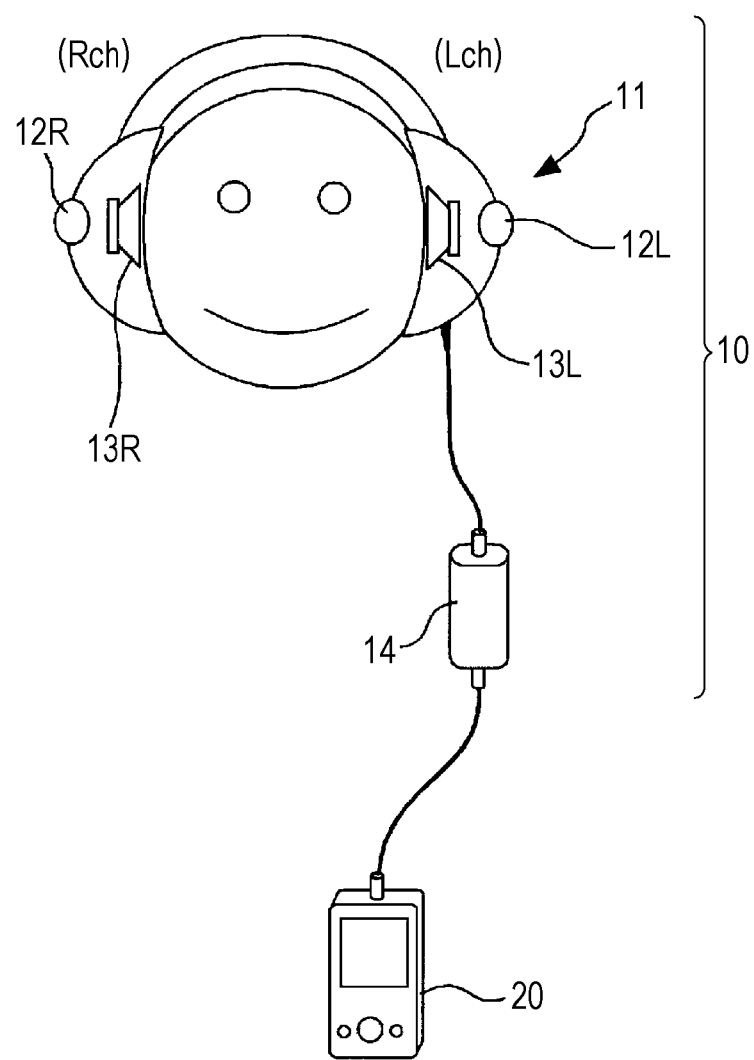
FIG. 4 is an explanatory diagram of an NC headphone according to an embodiment.

Hereinbelow, embodiments of the present disclosure will be described in the following order.

<1. Basic configuration and processing>
<2. Embodiments applied to an NC headphone>
  [2-1: Configuration of an NC headphone]
  [2-2: Sliding operation detecting section (Configuration Example I)]
  [2-3: Sliding operation detecting section (Configuration Example II)]
  [2-4: Sliding operation detecting section (Configuration Example III)]
<3. Embodiment in which a sliding guide is provided>
<4. Embodiment in which a directional sound source section is provided>
<5. Embodiment in which a sliding guide and a directional sound source section are provided>
<6. Embodiment in which a sliding sound source section is provided>
<7. Embodiments applied to various kinds of equipment and modifications>
<8. Program>
<1. Basic Configuration and Processing>

First, the basic configuration as an embodiment of the present disclosure will be described.

The present disclosure assumes a system that uses a microphone device mounted in equipment and used for the purpose of collecting sound, as a sensor for various kinds of operation inputs made to control the functions of the equipment.

As in Japanese Unexamined Patent Application Publication No. 2008-166897 described above, there have been proposed systems that allow functions to be switched or turned on/off by tapping (a tap) on a microphone or its vicinity. However, among the functions of various kinds of equipment, there are a function for which it is necessary to specify a specific time span in real time, and a function for which it is suitable to specify an operation quantity. By analogy to a typical switch, these functions correspond to such an operation as keeping pressing a push button switch for a predetermined time. In this regard, a mode of operation based on tapping of a microphone is not suited for operating such functions.

Accordingly, an embodiment of the present disclosure provides a user interface suited for a continuous operation or an operation for which an operation quantity is specified, by enabling an operation input to be made by a "sliding operation" whereby a finger or the like is moved while touching a microphone or its vicinity.

The present disclosure relates to a detection algorithm for detecting an operation input made by this sliding operation, and a mechanism associated with the detection algorithm. The detection algorithm according to an embodiment of the present disclosure makes it possible to obtain detection results with reduced processing resources by performing processing only on the temporal axis, without performing processing that necessitates a large amount of computation such as a frequency axis analysis.

The embodiments described below represent various kinds of electronic equipment installed with a sound signal processing apparatus that adopts the above-mentioned configuration to recognize an operation input made by a sliding operation.

FIG. 1 shows the basic configuration according to an embodiment.

FIG. 1 shows a sound signal processing section 1, a microphone 4, a microphone amplifier 5, an A/D converter 6, and a normal processing system 7.

The sound signal processing section 1 includes a sliding operation detecting section 2 and a control section 3. The sound signal processing section 1 corresponds to a sound signal processing apparatus according to an embodiment of the present disclosure. The sound signal processing section 1 is formed by, for example, a central processing unit (CPU) or a digital signal processor (DSP).

A sound signal collected by the microphone 4 is amplified by the microphone amplifier 5, before undergoing analog-digital conversion in the A/D converter 6. Then, the sound signal converted into a digital signal is inputted to the normal processing system 7 and the sound signal processing section 1.

The term normal processing system 7 as used herein refers to a processing section for functions normally associated with a sound signal in electronic equipment to which a sound signal is inputted from the microphone 4.

In consumer electronic equipment, the microphone 4 is already provided for various purposes. Alternatively, a separate microphone 4 can be connected to consumer electronic equipment.

Examples of such consumer electronic equipment include a digital camera equipped with a sound recording function as well as a picture recording function, an IC recorder, an information processing apparatus such as a personal computer having a voice communication function, mobile equipment, and a noise-cancelling headphone (hereinafter, "NC headphone").

In each of these kinds of electronic equipment, a processing system is provided with respect to a microphone input sound signal in accordance with its function.

For example, in the case of equipment having the function of recording sound to a recording medium, sections that perform processing such as compression for sound recording, encoding for recording, and recording to the recording medium make up the normal processing system 7 shown in FIG. 1.

In the case of equipment that is capable of communication such as a portable telephone, and has the function of transmitting a sound signal, sections that perform processing such as compression, encoding for transmission, and transmission make up the normal processing system 7 shown in FIG. 1.

Further, in the case of an NC headphone described later with reference to FIG. 3 onwards, the functional portion that performs a noise cancellation process corresponds to the normal processing system 7.

The normal processing system 7 performs processing according to these functions, with respect to an inputted sound signal.

The sound signal processing section 1 performs detection of a sliding operation with respect to an inputted sound signal, thereby detecting an operation input made by the user.

First, the sliding operation detecting section 2 detects the start and end of a user's sliding operation solely through processing on the temporal axis.

Specifically, when the time during which the energy level of the sliding sound signal component of an inputted sound signal is equal to or higher than a first level has continued for a first time or more, the sliding operation detecting section 2 determines that a sliding operation has started. At this time, the sliding operation detecting section 2 outputs a sliding start detection signal SdetS to the control section 3.

After the start is determined, when the time during which the energy level of the sliding sound signal component is lower than a second level has continued for a second time, the sliding operation detecting section 2 determines that the sliding operation has ended. At this time, the sliding operation detecting section 2 outputs a sliding end detection signal SdetE to the control section 3.

That is, the time from the determination of the start to the determination of the end is determined as the period during which the sliding operation is continued.

As will be described later, the sliding start detection signal SdetS and the sliding end detection signal SdetE may take various conceivable signal forms. The sliding start detection signal SdetS and the sliding end detection signal SdetE may not necessarily be two independent lines of signals but may be any such signal that allows the control section 3 to recognize the start and end of sliding.

The control section 3 is equipped with the function of performing a control process in accordance with at least a user operation in electronic equipment. When, on the basis of a sliding start detection signal SdetS, the control section 3 recognizes that the start of a sliding operation has been detected by the sliding operation detecting section 2, the control section 3 starts a predetermined control process that is set with respect to the sliding operation.

When, on the basis of a sliding end detection signal SdetE, the control section 3 recognizes that the end of the sliding operation has been detected by the sliding operation detecting section 2, the control section 3 ends the control process being executed.

Alternatively, the control section 3 performs a predetermined control process while recognizing the length of the period from the sliding start detection signal SdetS to the sliding end detection signal SdetE, that is, the length of the period during which the user is continuing the sliding operation, as an operation quantity.

Since the control process executed varies for each kind of electronic equipment, examples of control process will be described later in the description of specific embodiments of electronic equipment. For example, in the case of equipment having the function of playing back music data or the like, Volume Up/Down control, control of fast forward playback or rewind playback, and the like are conceivable. For example, turning up/down of the volume of playback sound, or the like is implemented by the user performing a sliding operation on the microphone 4.

FIGS. 2A and 2B illustrate how a sliding operation is performed.

FIG. 2A shows a personal computer 100. In the personal computer 100, for example, the microphone 4 is provided in the flat portion of the housing near the keyboard.

As shown in enlarged view, the user performs a sliding operation so as to trace the top surface of the microphone 4 or its vicinity, with a finger or a sliding tool such as a pen-shaped pointer.

The sound produced by the sliding operation is collected by the microphone 4, and is supplied to the sliding operation detecting section 2 in accordance with the configuration as shown in FIG. 1. The sliding operation detecting section 2 determines the start/end of the sliding operation by observing the amplitude or energy level (the absolute value of the amplitude) of the sliding sound signal component of the inputted sound signal.

FIG. 2B shows a part of a headphone (earphone) 200 that is provided with the microphone 4 for the purpose of noise cancelling, for example. The headphone 200 has a headphone driver 201, and an earpiece 202 that is the portion inserted by the user into his/her ear. The microphone 4 is provided on the side opposite from the earpiece 202, that is, at a position where the microphone 4 can collect external sound.

The user performs such a sliding operation as to trace the top surface of the microphone 4 or its vicinity with a finger or the like.

In the same manner as mentioned above, the sound produced by the sliding operation is collected by the microphone 4, and is supplied to the sliding operation detecting section 2 in accordance with the configuration as shown in FIG. 1. The sliding operation detecting section 2 determines the start/end of the sliding operation by observing the amplitude or energy level (the absolute value of the amplitude) of the sliding sound signal component of the inputted sound signal.

As described above, for example, a sliding operation is such an operation that the user touches and continuously traces the top surface of the microphone 4 or its vicinity in various kinds of electronic equipment with a finger or the like.

It should be noted that while FIGS. 2A and 2B depict a linear sliding operation, the user may perform a circular (rotary) sliding operation.

A linear sliding operation can be maintained only for a short time and, as a result, the user may not be able to perform intended control in some cases. In such cases, if the user is made to perform a circular sliding motion around the microphone 4, for example, the user can easily continue the sliding operation.

The basic configuration according to an embodiment of the present disclosure is as described above with reference to FIG. 1. That is, an input sound signal from the microphone 4 is inputted to the sound signal processing section 1, and the sound signal processing section 1 detects a user operation by determining a sliding operation. When it is detected that an operation input has been made, a predetermined control process is performed in accordance with the operation.

FIG. 3 shows the procedure of basic processing according to an embodiment.

In the sound signal processing section 1 to which a microphone-input sound signal is inputted at all times as shown in FIG. 1, as step F2, it is determined whether or not a sliding operation has been started. This is a process in the sliding operation detecting section 2. Then, if it is determined that a sliding operation as a user operation input has been started, the processing proceeds from step F2 to F3, and a control process according to the operation input is started as a process in the control section 3.

In step F4, as a process in the sliding operation detecting section 2, it is determined whether or not the user's sliding operation has been ended. Then, if it is determined that the sliding operation has been ended, the processing proceeds from step F4 to F5, and the action according to the operation input which has been executed by the control section 3 is ended.

In the following, embodiments will be described with a noise-cancelling headphone (NC headphone) as a specific example of electronic equipment.

Examples of other electronic equipment will be also described later.

<2. Embodiments Applied to an NC Headphone>

[2-1: Configuration of an NC Headphone]

FIG. 4 schematically shows a noise-cancelling headphone (NC headphone) 10 used by being connected to music playback equipment such as a portable media player 20.

The media player 20 plays back data such as music recorded on an internal recording medium, and outputs two channels, L and R, of sound signals to the connected NC headphone 10.

The NC headphone 10 includes a headphone section 11 and a noise cancellation section 14.

The headphone section 11 has L and R channels of speakers 13L and 13R inside respective speaker housings corresponding to the left and right ears of the user.

In the case of this example, a so-called feedforward noise cancellation process is performed. Microphones 12L and 12R are provided so as to collect external sounds from the outside of the left and right speaker housings, respectively.

It should be noted that the headphone section 11 may not be of a type having the speaker housing as shown in the drawing, but may be of an earphone type shown in FIG. 2B, or an ear-pad type. In this example, any of these types may be used as long as the microphones 12L and 12R are provided.

Also, the NC headphone 10 is not limited to an NC headphone that performs a feedforward noise cancellation process but may be an NC headphone that performs a feedback noise cancellation process.

The noise cancellation unit 14 is connected to the headphone section 11 provided with the microphones 12L and 12R as mentioned above.

The noise cancellation unit 14 mixes a noise reduction sound signal into the sound signal of playback music or the like supplied from the media player 20, thereby outputting a sound signal with reduced external noise from each of the speakers 13L and 13R.

Briefly speaking, noise reduction is performed as follows.

The microphones 12L and 12R each attached to the speaker housing collects external noise reaching the user's ear via the speaker housing. From the sound signal of the external noise collected by each of the microphones 12L and 12R, the noise cancellation unit 14 generates a noise reduction sound signal of acoustically opposite phase to the external noise. Then, the noise cancellation unit 14 synthesizes the generated noise reduction sound signal with the sound signal of playback music or the like, and supplies the resulting sound signal to each of the speakers 13L and 13R.

Accordingly, the sound outputted from each of the speakers 13L and 13R contains a component of opposite phase to external noise. Hence, this opposite phase component and the external noise that actually leaks in via the speaker housing spatially cancel each other out, with the result that as auditorily perceived by the user, the external noise component is reduced and the original output sound of the playback music reaches the user.

Figure 5:
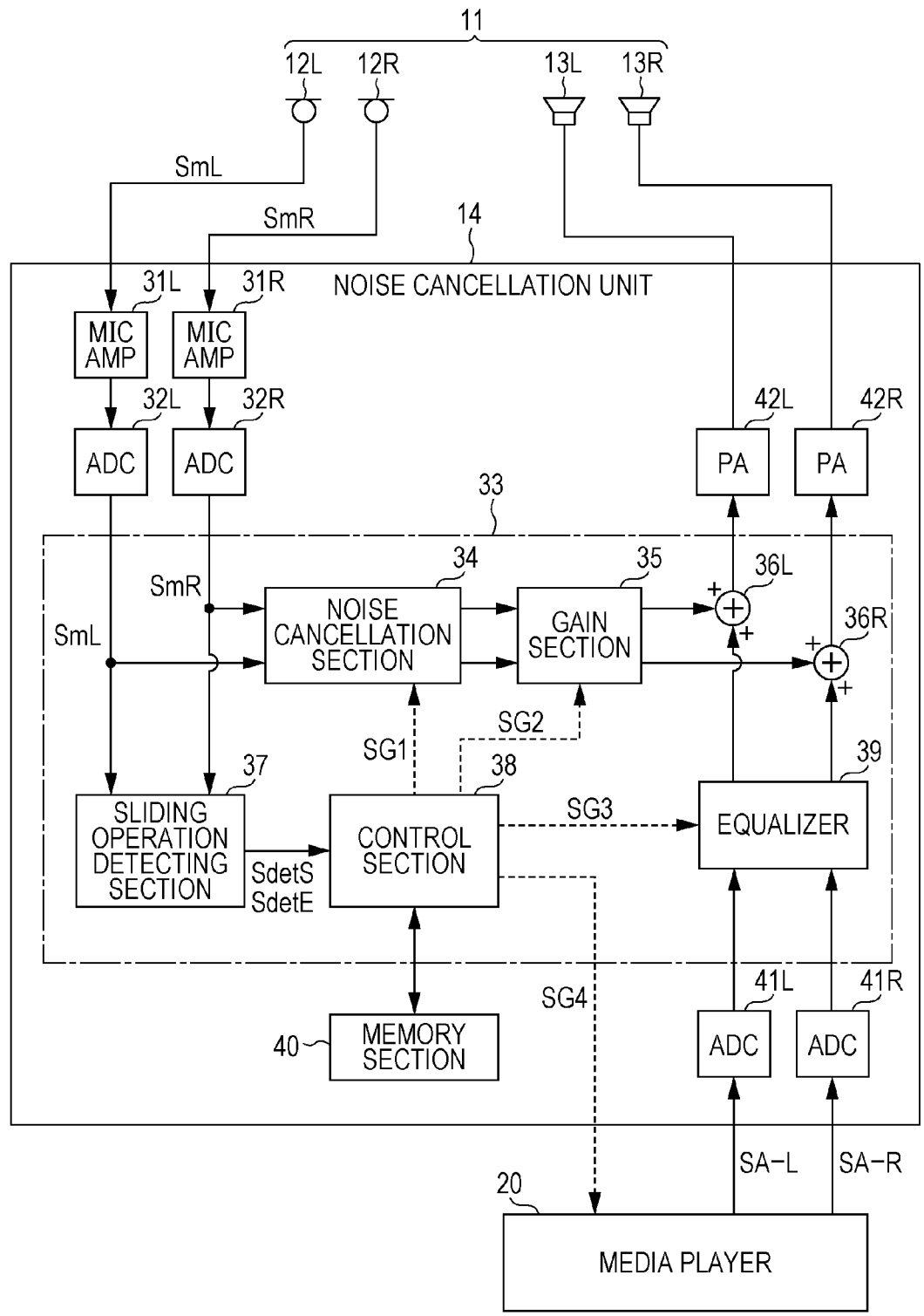
FIG. 5 is a block diagram of an NC headphone according to an embodiment.

An example of the internal configuration of the noise cancellation unit 14 is shown in FIG. 5.

The noise cancellation unit 14 has microphone amplifiers 31L and 31R, A/D converters 32L and 32R, a main processing section 33 formed by a DSP or CPU, a memory section 40, power amplifiers 42L and 42R, and A/D converters 41L and 41R.

The main processing section 33 is provided with a noise cancellation section 34, a gain section 35, adders 36L and 36R, a sliding operation detecting section 37, a control section 38, and an equalizer 39.

First, the sound signal of playback music or the like from the media player 20 is processed as follows.

From the media player 20, L and R channels of playback sound signals SA-L and SA-R as so-called headphone outputs are supplied.

The playback sound signals SA-L and SA-R are respectively converted into digital signals by the A/D converters 41L and 41R. Then, in the equalizer 39, these sound signals are subjected to sound quality correction such as amplitude-frequency characteristic correction or phase-frequency characteristic correction, or both.

The correction process in the equalizer 39 is executed on the basis of a control signal SG3 from the control section 38. For example, designation of frequency characteristics or the like is done by the control signal SG3.

The playback sound signals SA-L and SA-R that have undergone sound quality correction in the equalizer 39 are respectively added with noise reduction sound signals by the adders 36L and 36R, and supplied to the power amplifiers 42L and 42R, respectively.

The power amplifiers 42L and 42R may each be made of a digital amplifier, or may be made of a D/A converter and an analog amplifier.

Outputs from the power amplifiers 42L and 42R serve as driving signals for the speakers 13L and 13R, and sounds based on the playback sound signals SA-L and SA-R are outputted from the speakers 13L and 13R, respectively.

On the other hand, the processing for noise cancellation described above is performed as follows.

Sound signals SmL and SmR collected by the microphones 12L and 12R are amplified by the microphone amplifiers 31L and 31R in the noise cancellation unit 14, and then converted into digital signals in the A/D converters 32L and 32R, respectively.

The digitized sound signals SmL and SmR outputted from the A/D converters 32L and 32R are supplied to the noise cancellation section 34. The noise cancellation section 34 is configured as a digital filter that generates a noise reduction sound signal in the feedforward mode mentioned above. The noise cancellation section 34 performs filtering on each of the sound signals SmL and SmR, with a filter factor designated by a control signal SG1 from the control section 38, thereby generating L and R channels of noise reduction sound signals.

The generated L and R channels of noise reduction sound signals are supplied to the gain section 35. The gain section 35 gives a gain to the L and R channels of noise reduction sound signals, with a gain factor designated by the control signal SG1 from the control section 38.

Then, the L and R channels of noise reduction sound signals from the gain section 35 are supplied to the adders 36L and 36R, and added with the playback sound signals SA-L and SA-R as described above, respectively.

As playback sounds are outputted from the speakers 13L and 13R on the basis of the playback sound signals SA-L and SA-R to which the noise reduction sound signals have been added in this way, respectively, the noise reduction function as described above is exerted.

The noise cancellation unit 14 in this example further is equipped with the function of detecting a user operation made by a sliding operation on the microphone 12L, 12R or its vicinity.

The sound signals SmL and SmR respectively collected by the microphones 12L and 12R are also supplied to the sliding operation detecting section 37.

While the configuration and action of the sliding operation detecting section 37 will be described later in more detail, the sliding operation detecting section 37 detects a user's sliding operation on the microphone 12L, 12R and its vicinity solely through processing on the temporal axis. Specifically, when the energy level of the sliding sound signal component in the inputted sound signal SmL, SmR has continued to exceed a predetermined value for a first time or more, the sliding operation detecting section 37 determines that a sliding operation has been started. Then, to notify the start of operation input by the user, the sliding operation detecting section 37 outputs a sliding start detection signal SdetS to the control section 38.

Also, after the sliding operation is started, when the energy level of the sliding sound signal component has continued to be lower than a predetermined value for a second time or more, the sliding operation detecting section 37 determines that the sliding operation has been ended. Then, to notify the end of operation input by the user, the sliding operation detecting section 37 outputs a sliding end detection signal SdetE to the control section 38.

The control section 38 controls the individual sections of the noise cancellation unit 14 by the above-mentioned control signals SG1, SG2, and SG3. Also, the control section 38 can also transmit a control signal SG4 to the media player 20.

In this example, in particular, the control section 38 is equipped with the function of performing a control process in accordance with a user's sliding operation. That is, the control section 38 performs a predetermined control process that is set with respect to the sliding operation, during the period in which the sliding operation as grasped by the sliding start detection signal SdetS and the sliding end detection signal SdetE is being executed. For example, in response to detection of an operation inputted by a sliding operation, the control section 38 transmits operation input information to the media player 20 as the control signal SG4.

The memory section 40 stores information to be referenced by the control section 38 when performing a control process. For example, the memory section 40 stores information on the filter factors in the noise cancellation section 34 and the equalizer 39, and so on.

In this embodiment, the control section 38 performs a predetermined control in accordance with a user's sliding operation. A real-time, continuous control is suited for the control process. The following are assumed as examples of such control.

First, it is conceivable to transmit a command to the media player 20 as the control signal SG4 to thereby cause the media player 20 to execute, for example, the following actions.

Control to perform FF (fast forward)/REW (rewind) to a playback position desired by the user while listening to the sound, during the sliding operation period.

Control to turn playback off and noise cancellation off only during the sliding operation period (control to switch to a state suited for when making a conversation that will end soon).

Control of an operation to turn the noise cancellation function off only during the sliding operation period to facilitate hearing of ambient sounds.

Control to adjust the volume up or down to a volume position desired by the user, with the length of the sliding operation period as an operation quantity.

Control to adjust playback speed up or down to a playback speed desired by the user, with the length of the sliding operation period as an operation quantity.

Control to adjust playback pitch up or down to a playback pitch desired by the user, with the length of the sliding operation period as an operation quantity.

Control to partially play back multiple contents such as music or video sequentially during the sliding operation period, i.e., control of such an action as to allow the user to sequentially search through contents while partially viewing or listening to the contents, and play back the content at the instant when the sliding operation is stopped.

For example, supposing that a sliding operation is an operation related to the action of the media player 20, the control section 38 performs the process of transmitting a necessary command to the media player 20 during the sliding operation period detected by the sliding operation detecting section 37.

As will be described later, in the case where a sliding operation on the microphone 12L and a sliding operation on the microphone 12R are to be detected in a differentiated manner, two kinds of operations can be assigned. In that case, for example, assuming that a sliding operation on the microphone 12L means Volume up and a sliding operation on the microphone 12L means Volume down, the control section 38 performs the process of transmitting a "Volume up" or "Volume down" command to the media player 20, in response to detection of a sliding operation by the sliding operation detecting section 37.

Further, as will be described later, it is also possible to differentiate operations in accordance with the sliding direction, the sliding location, and so on. Also, on the basis of combinations of those differentiations and the left and right microphones 12L and 12R, a variety of operations can be set in a differentiated manner. In that case as well, the control section 38 transmits a predetermined command to the media player 20 in response to detection of each of those sliding operations.

To realize the noise cancellation function, it is necessary to mount the microphones 12L and 12R as close to the ears as possible. For this reason, the microphones 12L and 12R are usually mounted close to the ears. Thus, it is of great convenience to the user if the user is able to control the action of the media player 20 by simply performing a sliding operation on the microphone 12L, 12R, without taking the main body of the media player 20 out during a commute or the like, for example.

It is also conceivable for the control section 38 to perform internal control of the noise cancellation unit 14 in response to detection of a sliding operation.

For example, the control section 38 may be configured to switch the filter factor of the noise cancellation section 34 by control using the control signal SG1, in response to a sliding operation. For example, it is also possible to control such an action as to sequentially switch the filter factor in short time units during the sliding operation period so that the user can select the filter characteristic suited for the current condition.

Generally speaking, the noise environment characteristic varies greatly depending on the environment of each individual location such as an airfield, the platform of a train station, the inside of a train, a factory, or the like, even when observed as a frequency characteristic. Therefore, as the filter characteristic for noise reduction, it is desired to use the optimal filter characteristic suited to each individual noise environment characteristic. For this reason, it is advantageous to allow the user to sequentially switch to and select the most suitable filter characteristic by performing a sliding operation on the microphone 12L, 12R.

Also, the control section 38 may be configured to switch the gain factor of the gain section 35 by control using the control signal SG2, in response to a sliding operation. This allows the user to adjust the noise cancellation level in an arbitrary fashion through an easy operation.

Also, the control section 38 may be configured to change the filter factor in the equalizer 39 by control using the control signal SG3, in response to detection of a sliding operation. For example, it is also possible to control such an action as to sequentially switch the equalizing characteristic in short time units during the sliding operation period so that the user can select a preferred characteristic. This allows the user to select a sound quality correction state through an easy operation. For example, it is advantageous to store various preset frequency characteristics in the memory section 40 in advance, and allow the user to sequentially apply equalizer characteristics that provide a preferred sound quality and select a suitable characteristic at the end of the sliding operation.

[2-2: Sliding Operation Detecting Section (Configuration Example I)]

Figure 6:
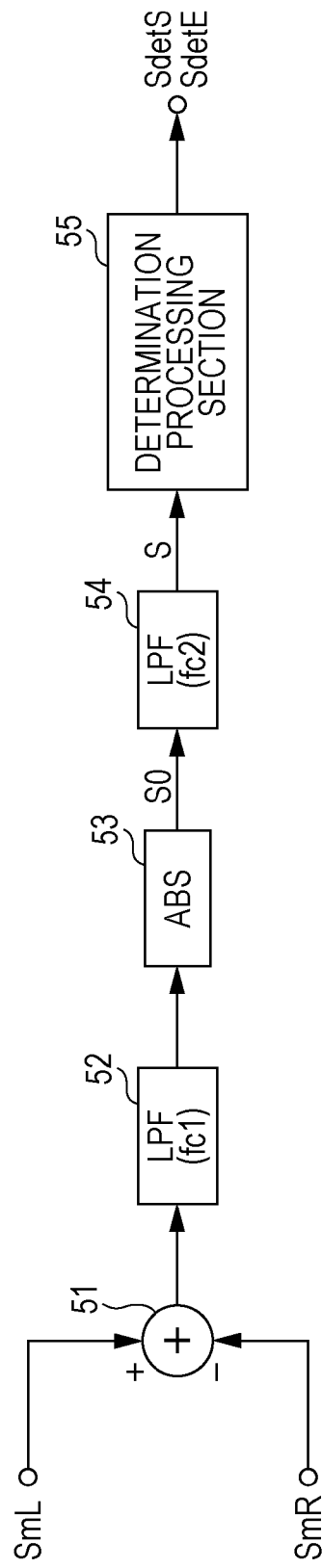
FIG. 6 is a block diagram of Configuration Example I of a sliding operation detecting section according to an embodiment.

Hereinbelow, the configuration and action of the sliding operation detecting section 37 will be described. Here, Configuration Example I shown in FIG. 6 will be described first.

This Configuration Example I represents a configuration example in which a sliding operation is detected in a manner common to the sound signals SmL and SmR from the microphones 12L and 12R.

The sliding operation detecting section 37 includes an adder 51, a low-pass filter 52, an absolutizing circuit 53, a low-pass filter 54, and a determination processing section 55.

The respective sound signals SmL and SmR from the microphones 12L and 12R are added together in the adder 51 and inputted to the low-pass filter 52. The cut-off frequency of the low-pass filter 52 is set to fc1. This cut-off frequency fc1 is set to a frequency for extracting a sliding sound signal component. In the case where the microphones 12L and 12R are each attached to a headphone housing molded from resin, for example, the cut-off frequency is set to such a frequency that makes it possible to extract the sound signal component produced when a finger is traced over the resin material. Therefore, a cut-off frequency fc1 suited for the kind of resin being used is determined. Of course, there are also cases where a component made of a metallic material or another material is used in the surroundings of the microphones 12L and 12R. Thus, the filter characteristic is determined in accordance with the material of the microphones 12L and 12R themselves or the material used in their surroundings.

During a sliding operation, a sliding sound produced near the microphone is the predominant component in the sound signal SmL or SmR. It should be noted, however, that the sound signals SmL and SmR also contain broad-bandwidth noise such as background noise and ambient noise. Accordingly, first, the sliding sound signal component is extracted with the low-pass filter 52.

Generally speaking, the sound signal component of a sound produced by a sliding motion has high energy in low frequencies. Thus, it is conceivable to extract the sliding sound signal component with the low-pass filter 52. However, depending on the material used, it is also conceivable to use a band-pass filter with a predetermined pass-band.

In any case, it suffices that the frequency band with high energy level of the sliding sound signal component be extracted first.

The sliding sound signal component in the summed signal of the sound signals SmL and SmR outputted from the low-pass filter 52 is absolutized in the absolutizing circuit 53.

The signal S0 absolutized in the absolutizing circuit 53 is converted into a signal S representing the energy level of the sound signal SmL, SmR via the low-pass filter 54, and inputted to the determination processing section 55. The cut-off frequency fc2 of the low-pass filter 54 is set to a frequency for converting the signal S0 into an envelope signal.

The determination processing section detects the start/end of a sliding operation through processing described later, with respect to the signal S. Then, as a result of the detection, the determination processing section outputs a sliding start detection signal SdetS and a sliding end detection signal SdetE to the control section 38.

The action of the sliding operation detecting section 37 described above will be described with reference to FIGS. 7 to 9.

Figure 7:
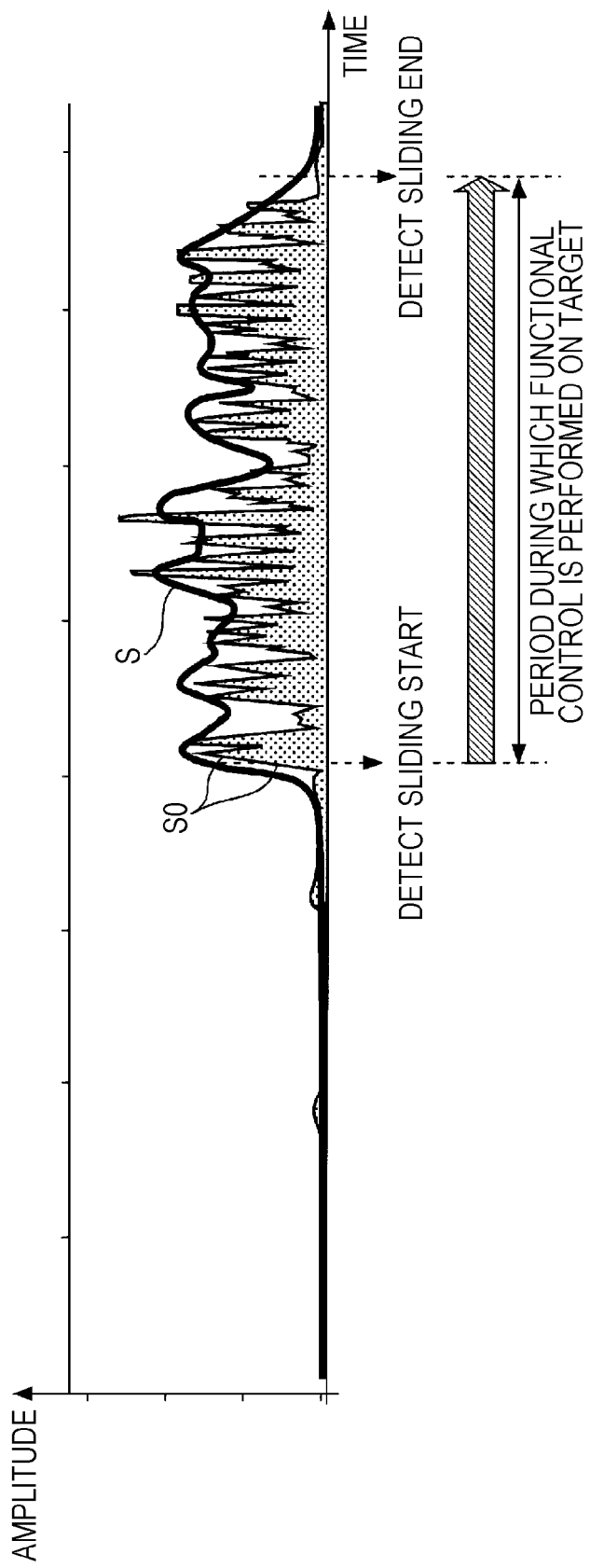
FIG. 7 is an explanatory diagram of sound signals processed in a sliding operation detecting section according to an embodiment.

FIG. 7 shows an example of the waveforms of the signal S0 and signal S when a sliding operation is performed.

As described above, the low-pass filter 52 extracts a sliding sound signal component. Since the output of the low-pass filter 52, which is the sliding sound signal component, has an amplitude with a positive/negative value, in order to determine the negative amplitude as an energy level as well, the signal S0 absolutized in the absolutizing circuit 53 is used.

As shown in the drawing, during the sliding operation period, the energy level of the signal S0 (the amplitude level of the absolutized sliding sound signal component) becomes high.

It should be noted, however, that a user's sliding operation is unstable, and tracing is not necessarily done with constant speed and force. Thus, the amplitude varies on very small time scales.

By representing this as the signal S enveloped by the low-pass filter 54, the period during which high energy level continues can be easily determined as the sliding operation period.

From this signal S, the determining processing section 55 determines the sliding operation period shown in the drawing, that is, the period during which functional control according to the sliding operation is performed with respect to a controlled object.

Figure 8:
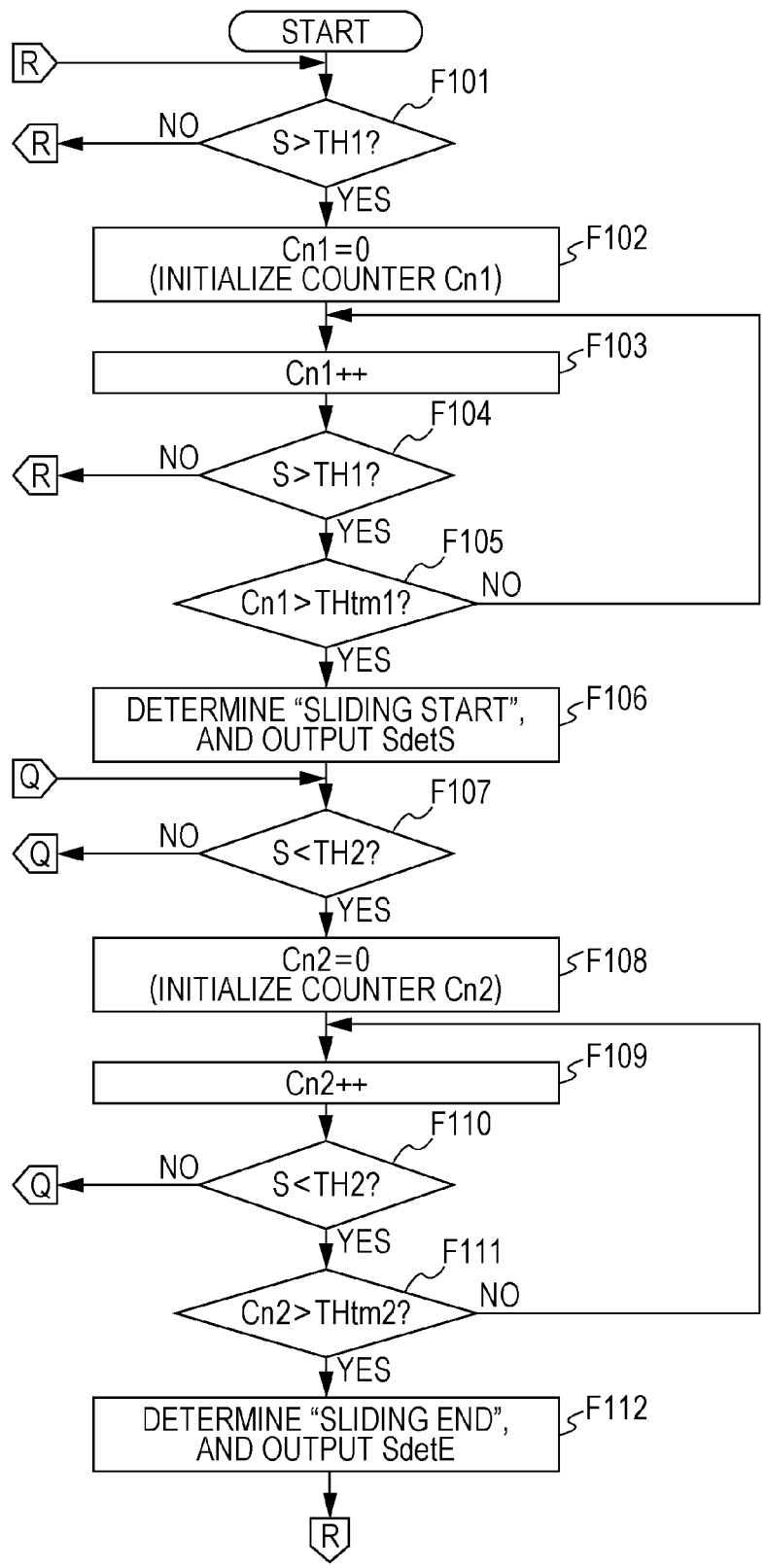
FIG. 8 is a flowchart of processing in a sliding operation detecting section according to an embodiment.

FIG. 8 is a flowchart of a process in which the determining processing section 55 determines the start and end of a sliding operation from the signal S.

The determining processing section 55 performs the sliding operation determination process shown in FIG. 8 with respect to the signal S that is inputted.

First, in step F101, the determining processing section 55 determines whether or not the level of the signal S is higher than a threshold TH1.

Figure 9:
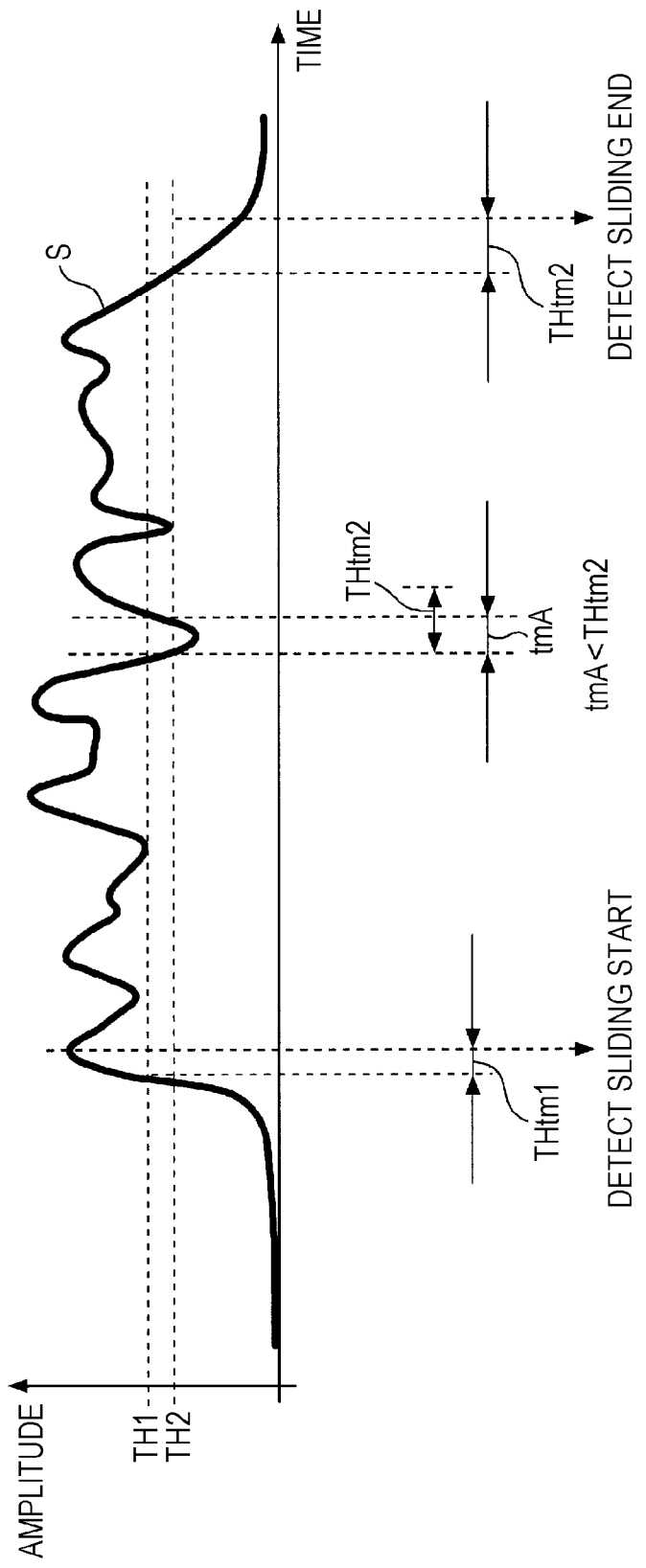
FIG. 9 is an explanatory diagram of determination of sliding operation start/end by a sliding operation detecting section according to an embodiment.

FIG. 9 shows the waveform of the signal S and thresholds TH1 and TH2. The threshold TH1 is a threshold for determining whether or not the energy level of the signal S has increased. On the other hand, the threshold TH2 is a threshold for determining whether or not the energy level of the signal S has decreased.

In step F101, the value of the signal S that is inputted is sequentially compared with the threshold TH1. If it is determined that the value of the signal S is equal to or smaller than the threshold TH1, the determining processing section 55 returns to step F101 as indicated by "R", and the next input value of the signal S is compared with the threshold TH1.

When the value of the signal S exceeds the threshold TH1, the determining processing section 55 proceeds to step F102.

In step F102, the determining processing section 55 first resets a counter Cn1 to 0, and causes counting to be started.

Then, while incrementing the counter Cn1 in step F103, the determining processing section 55 performs the determinations in steps F104 and F105.

In step F104, the determining processing section 55 determines whether or not the value of the signal S is larger than the threshold TH1.

In step F105, the determining processing section 55 determines whether or not the value of the counter Cn1 has reached a first time THtm1.

The first time THtm1 is a predetermined time interval as shown in FIG. 9. This is set as a time for determining that an increase that has occurred in the energy of the signal S is not momentary but is a continuous increase in energy level due to a sliding operation.

If it is detected in step F104 that the signal S is lower than the threshold TH1, it is determined that the increase in energy level detected in step F101 is a momentary one and not caused by a sliding operation, and the determination processing section 55 returns to step F101 as indicated by "R". That is, it is determined that a sliding operation has not been started.

On the other hand, the case where it is determined in step F105 that the value of the counter Cn1 has reached the first time THtm1 is a case where it is determined that the state in which the energy level of the signal S is larger than the threshold TH1 has continued.

At this time, the determination processing section 55 proceeds to step F106, and determines that a sliding operation has been started. Then, the determination processing section 55 outputs a sliding start detection signal SdetS to the control section 38.

After determining that a sliding operation has been started, the determining processing section 55 proceeds to step F107, and starts determination of the end of the sliding operation.

First, in step F107, the determination processing section 55 compares the signal S with the threshold TH2, and determines whether or not the signal S has become lower than the threshold TH2.

As shown in FIG. 9, for example, the threshold TH2 is set to a slightly lower level than the threshold TH1. This threshold TH2 is a value for determining a decrease in the energy level of the signal S.

When the signal S has become smaller than the threshold TH2, the determination processing section 55 regards this as indicating a possibility that the sliding operation has been ended, and proceeds to step F108.

In step F108, the determination processing section 55 resets a counter Cn2 to 0, and causes counting to be started.

Then, while incrementing the counter Cn2 in step F109, the determining processing section 55 performs the determinations in steps F110 and F111.

In step F110, the determination processing section 55 determines whether or not the signal S has become lower than the threshold TH2.

Also, in step F111, the determination processing section 55 determines whether or not the value of the counter Cn2 has reached the second time Thmt2.

The second time THtm2 is a predetermined time interval as shown in FIG. 9. This is set as a time for determining that a decrease that has occurred in the energy of the signal S is not momentary but is a continuous decrease in energy level following the end of the sliding operation.

If it is detected in step F110 that the signal S has not become lower than the threshold TH2, it is determined that the decrease in energy level detected in step F107 is a momentary one and not caused by ending of the sliding operation, and the determination processing section 55 returns to step F107 as indicated by "Q". That is, it is determined that the sliding operation has not been ended.

For example, FIG. 9 shows, as a period tmA, a state in which, after the start of sliding, the energy level of the signal S has temporarily decreased below the threshold TH2. In this case, the period tmA is a period shorter than the second time THtm2. In such a case, the decrease is determined as a temporary decrease in level during the sliding operation.

A sliding operation performed by the user is not necessarily a regular sliding motion. As mentioned above, the sliding motion is not performed with a fixed force at a constant speed. Moreover, momentary stoppage of the sliding motion due to a finger getting stuck or the like during sliding is a common occurrence.

For this reason, it is not appropriate to determine that the sliding operation has been ended as soon as a decrease in the energy level of the signal S is observed. Accordingly, the second time THtm2 is set, and if the period during which the decrease has occurred is less than the second time THtm2, it is determined that the sliding operation has not been ended.

On the other hand, the case where it is determined in step F111 that the value of the counter Cn2 has reached the second time THtm2 is a case where it is determined that the state in which the energy level of the signal S is smaller than the threshold TH2 has continued.

At this time, the determination processing section 55 proceeds to step F112, and determines that the sliding operation has been ended. Then, the determination processing section 55 outputs a sliding end detection signal SdetE to the control section 38.

For example, in FIG. 9, after the energy level of the signal S drops below the threshold TH2 for the second time, the state in which the energy level has dropped continues for the second time Thtm2 or more. In that case, it is determined that the sliding operation has been ended.

In the sliding operation detecting section 37 in this example, the determination processing section 55 determines the start/end of a sliding operation in the manner as described above with reference to FIG. 8. This allows the control section 38 to recognize the period during which the sliding operation is being performed, thereby enabling a control based on a sliding operation as a continuous operation or an operation for which an operation quantity is specified.

Also, in the sliding operation detecting section 37, the determining processing section 55 determines the start/end of a sliding operation by observing an increase/decrease in energy level on the temporal axis. This makes it possible to determine a sliding operation easily without causing an increase in resources.

When a sliding operation is performed, the energy level (amplitude) of a sound signal of a predetermined band (sliding sound signal component) in a microphone input signal increases. Accordingly, by monitoring the energy of the sliding sound signal component, a sliding operation can be detected by determining an increase/decrease in energy, without performing a waveform analysis.

This enables a reduction in processing load for detecting an operation, and the resulting cost reduction. In particular, in the case of equipment that is compact and has small resources such as the noise cancellation unit 14 of the NC headphone 10, it is very advantageous to be able to perform a necessary detection process through such a simple action.

It is necessary to execute the operation input detection process at all times to handle irregular user operations. For this reason, since the detection process is signal processing on the temporal axis with a small amount of computation, such a detection process is suitable as a process to be executed at all times.

Furthermore, since the detection process is simple, the time necessary for detecting the start or end of a sliding operation is shortened, thereby enabling the action of the apparatus with good response.

In the case of this example, even when there is a momentary drop in the energy level of the signal S due to momentary stoppage of sliding or the like, this is not immediately regarded as the end of the sliding operation.

For example, even when the energy level drops temporarily for a very short time due to resting of a finger for some time during the course of sliding, irregular mixing of noise, or the like, if the energy level increases immediately after the drop, then it is determined that the sliding operation is being continued.

Thus, as detection of a user operation, it is possible to detect the end of the operation in a favorable manner and as intended by the user. That is, it is unnecessary for the user to pay too much attention to making a careful sliding motion, thereby allowing for easy operation.

According to Configuration Example I shown in FIG. 5, the user may perform a sliding operation on either one of the left and right microphones 12L and 12R.

Thus, when, for example, one hand is occupied doing something like carrying a bag, a sliding operation can be performed easily using the other, unoccupied hand, thus providing improved operability.

Then, in response to detection of a sliding operation by the sliding operation detecting section 37 in this way, the control section 38 performs a control according to the kind of operation assigned to this sliding operation, for example, the control illustrated above.

If the control section 38 is to transmit a command for controlling the action of the media player 20, the user is able to operate the media player 20 while keeping the media player 20 in a pocket or a bag during a commute or the like.

Also, since the operation method used is such that a sliding motion is made with a finger or the like, it is possible to intuitively control the media player 20 or the noise cancellation unit 14.

Also, since the mode used is such that a sliding motion is made on the microphone 12L, 12R or its vicinity, implementation is possible as long as there are an ordinary (inexpensive) microphone and a signal processing section such as a CPU/DSP even without using a special sensor such as a touch sensor, which contributes to reducing cost.

Furthermore, in the case of the NC headphone 10 in this example, the headphone section 11 is provided with the microphones 12L and 12R for the noise cancellation function. Since a sliding operation can be performed using the microphones 12L and 12R, it is unnecessary to provide an additional sensor device for operation input. This configuration example is suited for cost reduction also in this respect, and also does not cause an increase in the number of components that make up the apparatus.

While in the example shown in FIG. 5 the sound signals SmL and SmR from the respective L and R channels of microphones 12L and 12R are synthesized to determine a sliding operation, only one of the channels of sound signals (for example, the sound signal SmL) may be inputted to the low-pass filter 52. In that case, only the microphone 12L on the corresponding channel is used for the purpose of the sliding operation.

[2-3: Sliding Operation Detecting Section (Configuration Example II)]

The sliding operation detecting section 37 as Configuration Example II will be described with reference to FIG. 10.

Configuration Example II is an example in which the L channel and the R channel, that is, the microphones 12L and 12R can be assigned to different operations.

For example, this configuration example is such that a sliding operation on the microphone 12L can be assigned to Volume up, and a sliding operation on the microphone 12R can be assigned to Volume down.

Figure 10:
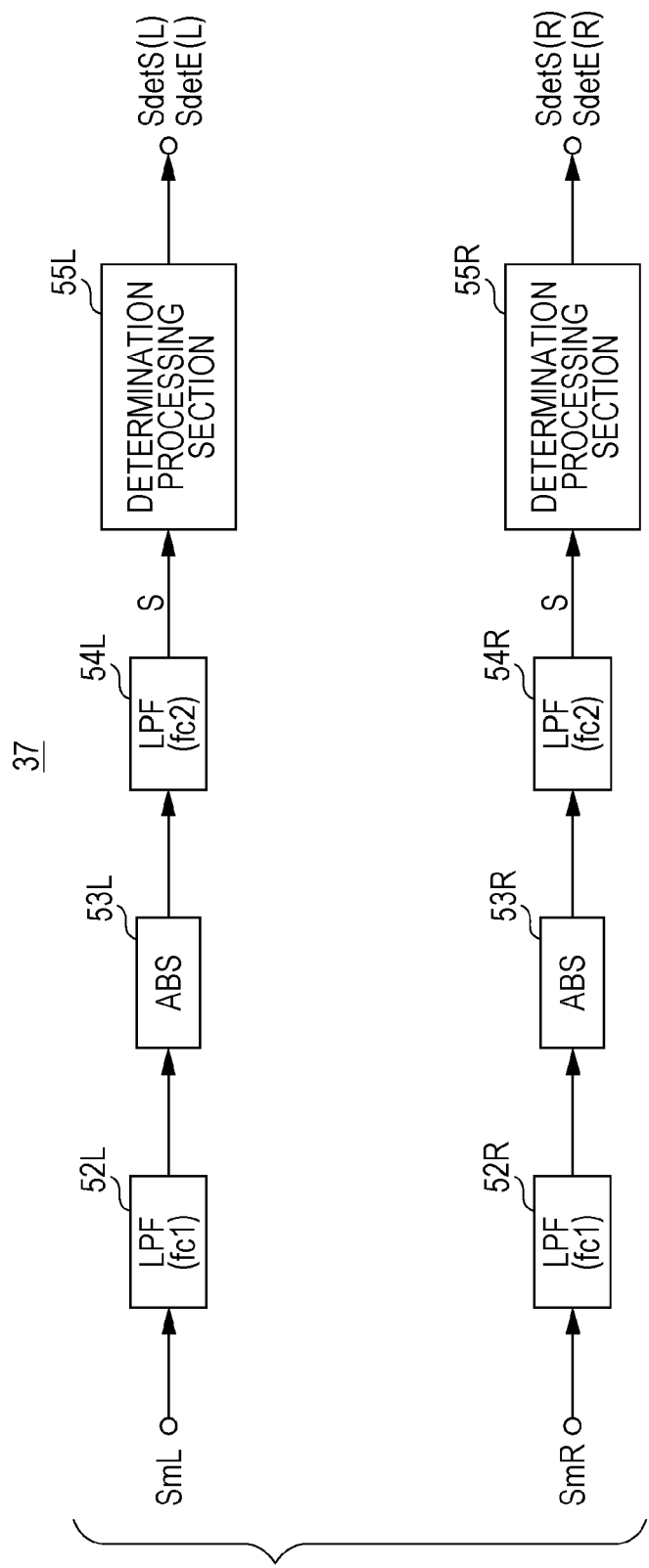
FIG. 10 is a block diagram of Configuration Example II of a sliding operation detecting section according to an embodiment.

As shown in FIG. 10, the sliding operation detecting section 37 adopts two independent lines of sliding operation detection configurations for the L channel and the R channel.

That is, a low-pass filter 52L, an absolutizing circuit 53L, a low-pass filter 54L, and a determination processing section 55L are provided for the sound signal SmL from the microphone 12L. Also, a low-pass filter 52R, an absolutizing circuit 53R, a low-pass filter 54R, and a determination processing section 55R are provided for the sound signal SmR from the microphone 12R.

Since the actions of the low-pass filters 52L and 52R, the absolutizing circuits 53L and 53R, and the low-pass filters 54L and 54R are the same as the actions of the low-pass filter 52, the absolutizing circuit 53, and the low-pass filter 54 according to Configuration Example I mentioned above, repetitive description is avoided.

The determination processing sections 55L and 55R may each perform the process of determining the start/end of a sliding operation as shown in FIG. 8, for example.

Upon detecting the start of a sliding operation with respect to a signal S obtained from the sound signal SmL, the determination processing section 55L outputs a sliding start detection signal SdetS(L) to the control section, and upon detecting the end of the sliding operation 38, the determination processing section 55L outputs a sliding end detection signal SdetE(L) to the control section 38.

Upon detecting the start of a sliding operation with respect to a signal S obtained from the sound signal SmR, the determination processing section 55R outputs a sliding start detection signal SdetS(R) to the control section 38, and upon detecting the end of the sliding operation, the determination processing section 55R outputs a sliding end detection signal SdetE(R) to the control section 38.

The control section 38 can recognize two kinds of operation inputs on the basis of the sliding start detection signal SdetS(L) and the sliding end detection signal SdetE(L), and the sliding start detection signal SdetS(R) and the sliding end detection signal SdetE(R). Therefore, for example, the above-mentioned Volume Up/Down control or the like can be performed in accordance with those operation inputs.

According to Configuration Example II as described above, two kinds of operations can be switched according to use with the left and right microphones 12L and 12R, making this configuration suitable for improving user operability.

[2-4: Sliding Operation Detecting Section (Configuration Example III)]

Figure 11:
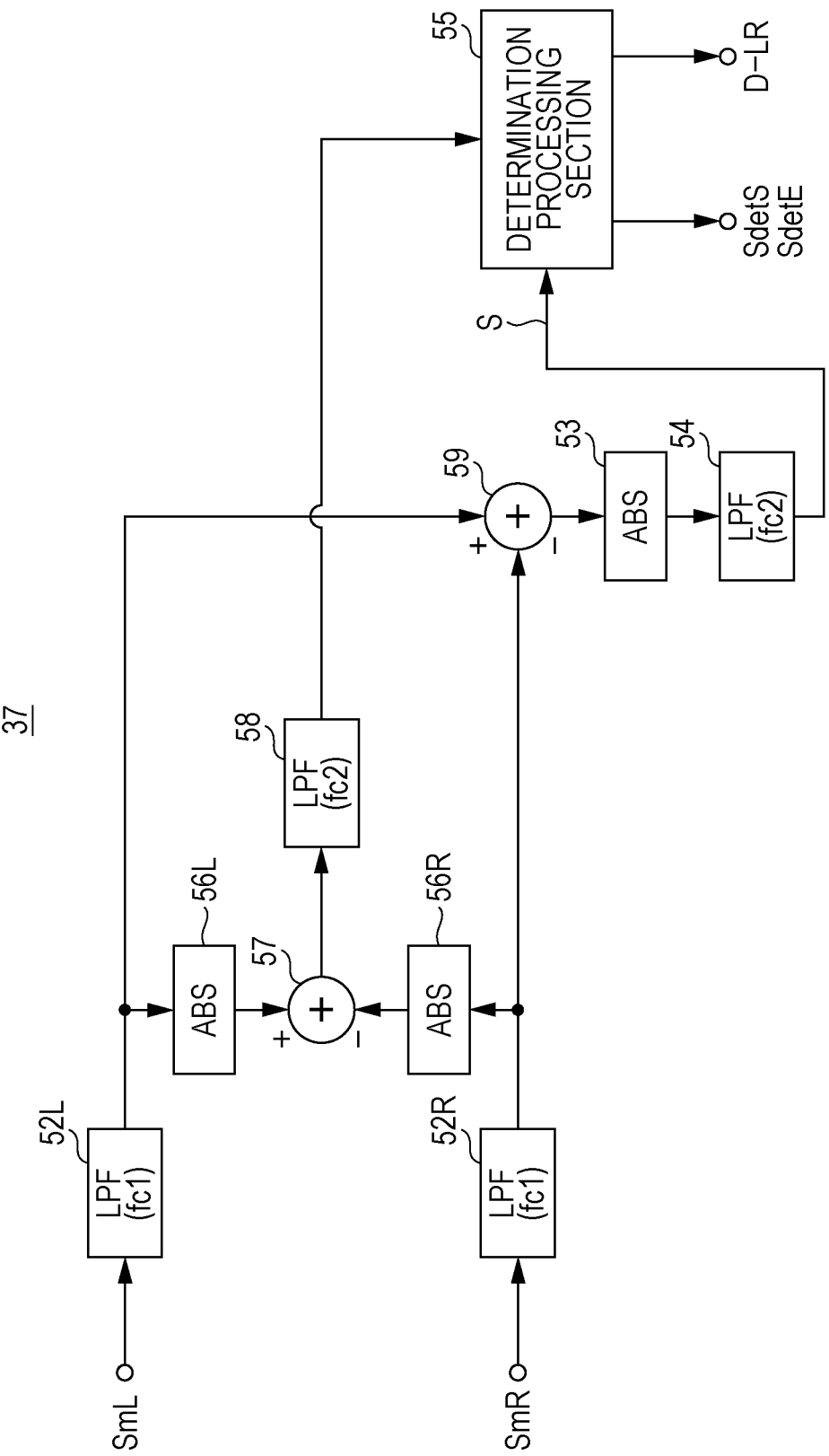
FIG. 11 is a block diagram of Configuration Example III of a sliding operation detecting section according to an embodiment.

Next, Configuration Example III is shown in FIG. 11. In this example, as in Configuration Example II mentioned above, the L channel and the R channel, that is, the microphones 12L and 12R can be assigned to different operations. In the case of Configuration Example II mentioned above, the sliding operation detecting section 37 is simply installed with two lines of sliding operation detection processing systems, and thus the load on the configuration is large. Configuration Example III can reduce the load on the configuration.

In Configuration Example III, the sliding operation detecting section 37 performs a channel determination process which determines a channel that contains a sliding sound signal component from among a plurality of channels of sound signals SmL and SmR, and a sliding operation start/end determination process with respect to a sound signal obtained by adding or subtracting sliding sound signal components from the plurality of channels to or from each other. A sliding operation, and the channel on which the sliding operation has been performed can be thus detected.

In this case, as shown in FIG. 11, the sound signal SmL from the microphone 12L is inputted to the low-pass filter 52L, and a sliding sound signal component is extracted with the cut-off frequency fc1.

The sound signal SmR from the microphone 12R is inputted to the low-pass filter 52R, and a sliding sound signal component is extracted with the cut-off frequency fc1.

The output of the low-pass filter 52L is supplied to an absolutizing circuit 56L and a subtractor 59.

The output of the low-pass filter 52R is supplied to an absolutizing circuit 56R and the subtractor 59.

The absolutizing circuit 56L absolutizes the output of the low-pass filter 52L, and supplies the resulting output to a subtractor 57. The absolutizing circuit 56R absolutizes the output of the low-pass filter 52R, and supplies the resulting output to the subtractor 57.

Therefore, as the output of the subtractor 57, the difference in energy level between the respective sliding sound signal components of the left and right channels of sound signals SmL and SmR appears.

The output of the subtractor 57 is converted into an envelope signal by a low-pass filter 58 with the cut-off frequency fc2, and supplied to the determination processing section 55.

In the determination processing section 55, when a sliding operation is performed on either the microphone 12L or 12R, it is possible to detect on which of the microphones 12L and 12R the sliding operation has been performed, by determining whether the envelope signal is positive or negative.

The respective sliding signal components in the sound signals SmL and SmR extracted with the low-pass filters 52L and 52R are subjected to a subtraction process in the subtractor 59, and their difference value is extracted.

When a sliding operation is performed on one of the microphones 12L and 12R, the energy of the sliding signal component of the sound signal from the microphone on which the sliding operation has been performed increases. Therefore, as the output of the subtractor 59, an energy increase component due to the sliding operation appears.

This output of the subtractor 59 is absolutized in the absolutizing circuit 53, converted into an enveloped signal S by the low-pass filter 54 with the cut-off frequency fc2, and supplied to the determination processing section 55.

The determination processing section 55 performs a sliding operation determination process with respect to the signal S, and outputs a sliding start detection signal SdetS, a sliding end detection signal SdetE, and an L-channel/R-channel determination signal D-LR to the control section 38 in accordance with the determination process with respect to the signal S.

Figure 12:
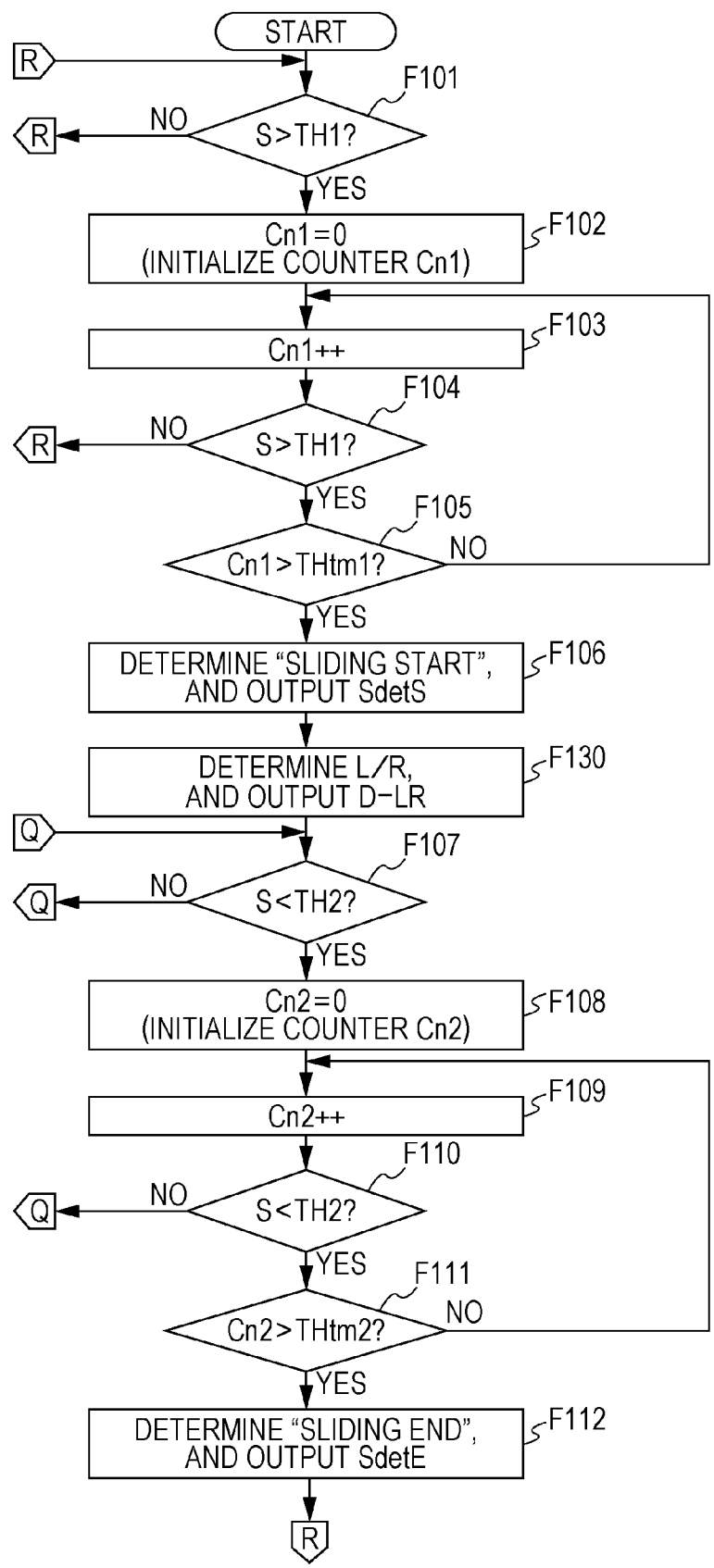
FIG. 12 is a flowchart of processing in a sliding operation detecting section in Configuration Example III according to an embodiment.

The determination process in the determination processing section 55 in this case may be performed in the manner as shown in FIG. 12, for example.

It should be noted that in FIG. 12, processes that are the same as those in FIG. 8 mentioned above are denoted by the same step numbers, and repetitive description is avoided.

In the processing shown in FIG. 12, in steps F101 to S106, the start of a sliding operation is determined in the same manner as in FIG. 8.

Then, if it is determined in step F106 that sliding has been started, the determination processing section 55 performs L/R determination in step F130.

That is, whether the signal from the low-pass filter 58 shown in FIG. 11 is positive or negative is determined at this point. In the case of the configuration as shown in FIG. 11 in which the R channel of absolutized signal is subtracted from the L channel of absolutized signal, if the signal from the low-pass filter 58 is positive, the channel in question is determined to be the L channel, and if the signal is negative, the channel in question is determined to be the R channel.

This L/R determination is a process that detects on which of the microphones 12L and 12R a sliding operation has been performed. Then, the determination processing section 55 outputs an L-channel/R-channel determination signal D-LR indicating the result of the L/R determination to the control section 38.

Therefore, when the start of a sliding operation is detected, a sliding start detection signal SdetS and a determination signal D-LR are supplied to the control section 38.

Next, the determination processing section 55 determines the end of the sliding operation in steps F107 to F111 in the same manner as in FIG. 8.

Then, if it is determined that the sliding operation has been ended, in step F112, the determination processing section 55 outputs a sliding end detection signal SdetE to the control section 38.

In the case of Configuration Example III described above, the control section 38 can recognize two kinds of operation inputs made by using the microphones 12L and 12R separately, on the basis of a sliding start detection signal SdetS, a sliding end detection signal SdetE, and a determination signal D-LR, thereby allowing Volume Up/Down control or the like to be performed in accordance with those operation inputs, for example.

Therefore, according to Configuration Example III described above as well, two kinds of operations can be switched according to use with the left and right microphones 12L and 12R, making this configuration suitable for improving user operability. Moreover, the load on the configuration of the sliding operation detecting section 37 can be reduced in comparison to Configuration Example II. In particular, the fact that only a single determination processing section 55 suffices contributes to reduced processing (resource) load.

It should be noted that it is also conceivable to use an adder instead of the subtractor 59.

<3. Embodiment in which a Sliding Guide is Provided>

Next, a description will be given of an embodiment in which a sliding guide that guides the sliding operation position is provided on the microphone side. This embodiment serves as an embodiment of the microphone apparatus according to the present disclosure.

The manner in which a sliding operation is performed on the microphone 4 has been illustrated above in FIGS. 2A and 2B. It has been described above that in that case, a sliding operation is such as operation as to simply trace the area where the microphone 4 is formed.

In contrast, FIGS. 13A and 13B each show a configuration in which a sliding guide 8 is provided in the vicinity of the microphone 4.

Like FIG. 2A, FIG. 13A shows a case in which the microphone 4 is provided in a predetermined area on the housing of the personal computer 100.

In the case of FIG. 13A, the sliding guide 8 having a ring-like shape is formed around the microphone 4.

Like FIG. 2B, FIG. 13B also shows, for example, a part of the headphone (earphone) 200 provided with the microphone 4 for the purpose of noise cancellation. In this case as well, the sliding guide 8 having a ring-like shape is formed around the microphone 4.

The sliding guide 8 may be simply any structural part that can be tactilely recognized by the user. For example, the sliding guide 8 is formed in a projected or recessed shape so as to be able to guide the sliding motion made with a user's finger. That is, the sliding guide 8 may be any structure that is mounted for the purpose of allowing the user to smoothly move a finger or the like in a circular fashion while being aware of the sliding guide 8.

While in the case of FIGS. 13A and 13B mentioned above a recessed, that is, ring-like groove is formed around the microphone 4, a projected (rail-like) ring may be formed as well.

It has been mentioned above that a sliding operation is easy if the user is to make the sliding operation in a rotary fashion (in the manner of drawing a circle). In this regard, for example, if the sliding guide 8 having a ring-like shape is provided in this way, the user can perform a rotary sliding operation more easily. That is, when the user rotates a finger while touching the sliding guide 8 with the fingertip, the resulting motion becomes a sliding operation.

Then, as the user performs a rotary sliding operation while being guided by the sliding guide 8, it is easier for the user to continue the sliding operation for a relatively long time, for example.

In addition, the provision of the sliding guide 8 can eliminate situations in which the user performs a sliding operation at a position far from the microphone 4 and thus the operation is not determined appropriately, or the user does not know where a sliding motion should be made.

While in this example the ring-like sliding guide 8 that guides a rotary sliding operation has been illustrated, the sliding guide 8 may have a linear or bowed shape. Alternatively, the sliding guide 8 may have a ring shape or linear shape that is partially cut away.

<4. Embodiment in which a Directional Sound Source Section is Provided>

Figure 14A:
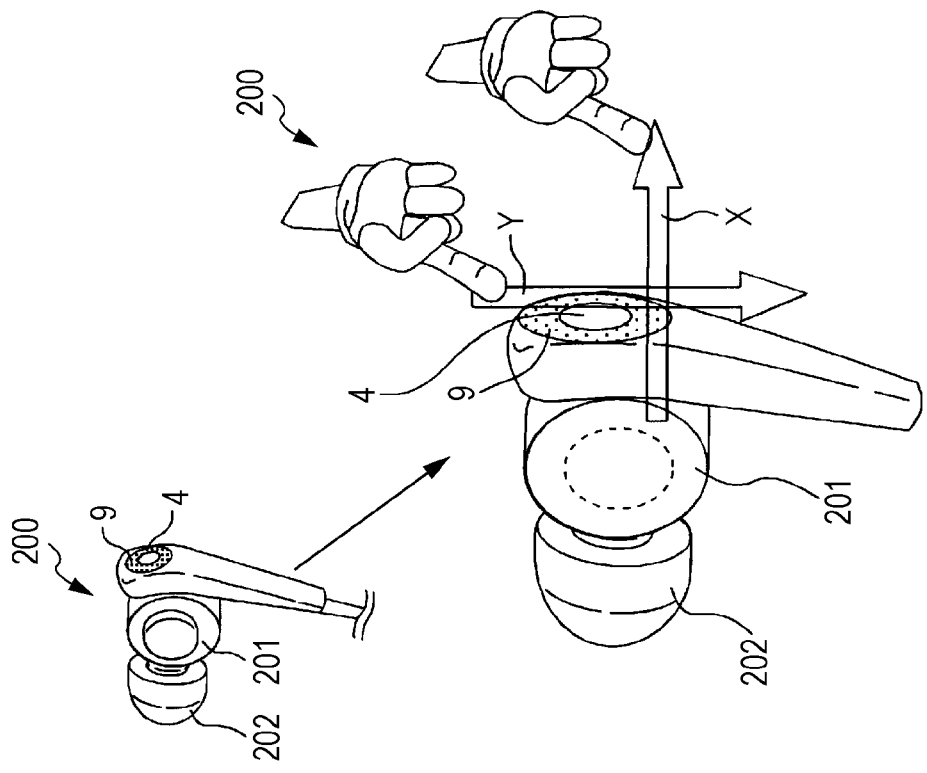
FIGS. 14A and 14B are each an explanatory diagram of a configuration including a directional sound source section according to an embodiment.
Figure 14B:
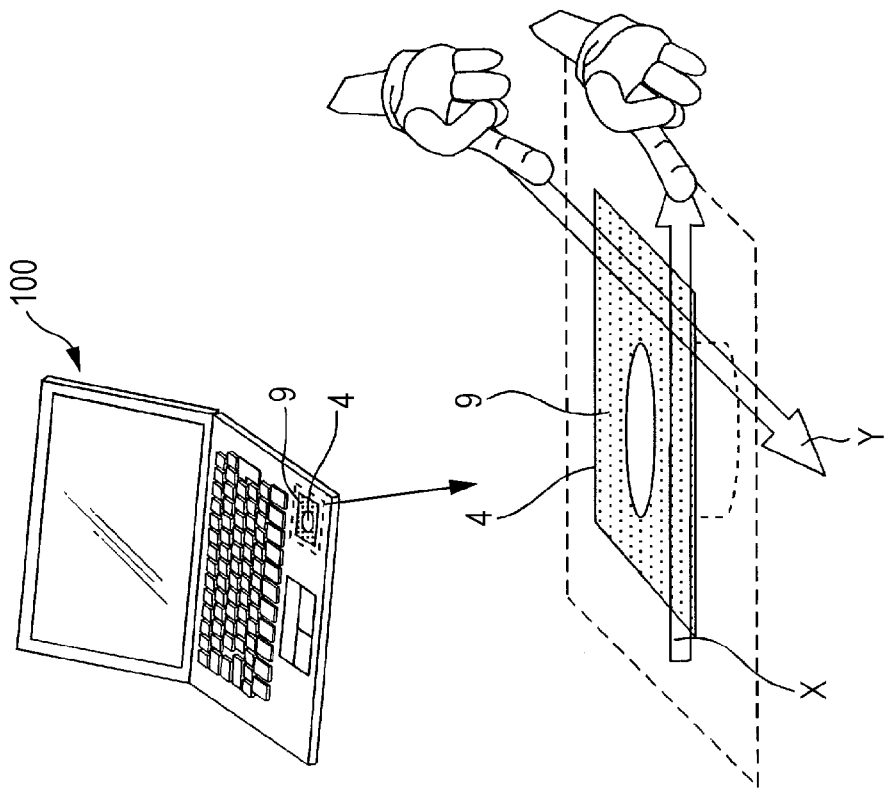

Further, as an embodiment of a microphone apparatus, FIGS. 14A and 14B illustrate an example in which a directional sound source section 9 that produces different sound signal components depending on the direction of a sliding operation is provided in the vicinity of the microphone 4.

Like FIGS. 2A and 2B and FIGS. 13A and 13B, FIGS. 14A and 14B also show examples of the personal computer 100 and the headphone 200, respectively. In these drawings, the portion around the microphone 4 serves as the directional sound source section 9.

The directional sound source section 9 is a portion of a material or structure that produces different sounds depending on the sliding direction.

Figure 15A:
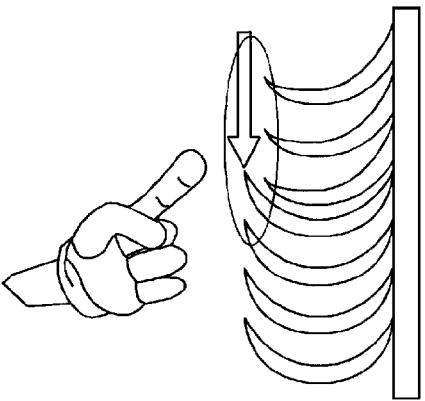
FIGS. 15A to 15C are each an explanatory diagram of an example of a directional sound source section according to an embodiment.
Figure 15B:
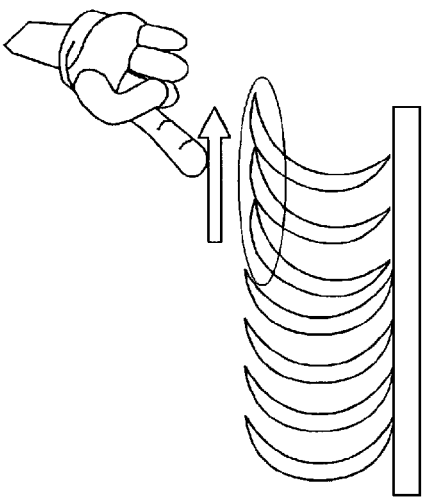
Figure 15C:
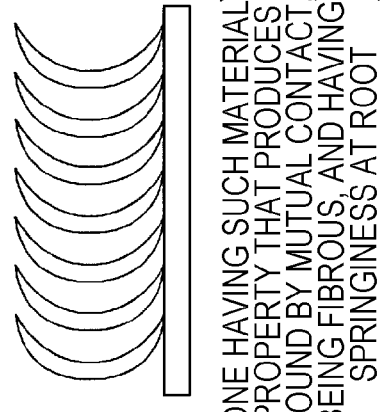

An example of the directional sound source section 9 is shown in FIGS. 15A to 15C. For example, FIG. 15A shows one that has such a material property that produces sound by mutual contact, is fibrous, and has springiness at the root. This may be a material having such properties, or may be a structure made from a mold or the like.

In this case, it is supposed that the directional sound source section 9 has such a property that when a sliding operation is performed to the right as shown in FIG. 15B, for example, mutual contact readily occurs and sound is readily produced, but when a sliding operation is performed to the left as shown in FIG. 15C, no mutual contact occurs and thus sound is hardly produced.

That is, the frequency characteristic of the produced sound varies depending on the direction of the sliding operation. By detecting this difference in sound between the two directions, a different control process can be performed for each direction.

Examples of the direction sound source section 9 include one made of hair such as pig hair, one woven in a thread or fabric form with nylon, polypropylene, polyolefine, ABS, glass fiber, FRP, or the like, and one made of a material such as a substance subjected to a fabric finish that fluffs up the both sides of a textile, such as a velvet or velour fabric made from not only hair or silk but also cotton, rayon, acetate, or the like.

Also, a structure made of a material such as metal, rubber, or resin, or a combination of such materials can be also made to produce different sounds when touched from different directions depending on its structural shape, and thus can be used as the direction sound source section 9.

While FIGS. 15A to 15C mentioned above are directed to the case of sliding in one direction and in a direction opposite to the direction, as described above, there are a variety of conceivable materials and structures that produce different sounds depending on the sliding direction.

Of course, with regard to the sliding direction according to which the produced sound differs, the sound can be made to differ not only between the forward and reverse directions of sliding as shown in FIGS. 15A to 15C but also between an X-direction and a Y-direction orthogonal to the X-direction. Furthermore, the sound can be made to differ between the X-direction, the Y-direction, and a diagonal direction.

Furthermore, as shown in FIG. 20A, the sound can be also made to differ between a forward X-direction (X1), a reverse X-direction (X2), a forward Y-direction (Y1), and a reverse Y-direction (Y2).

FIGS. 14A and 14B each show a case in which the directional sound source section 9 of such a material or structure that produces different sounds between sliding in the X-direction and sliding in the Y-direction.

In this case, the produced sound differs between when making a to-and-fro sliding motion in the X-direction and when making a to-and-fro sliding motion in the Y-direction. Thus, for example, the sliding operation detecting section 2 illustrated in FIG. 1 can determine not only the start/end of a sliding operation but also whether the sliding operation is performed in the X-direction or in the Y-direction. The control section 3 can perform a control process according to the determination.

Consequently, as the user performs a sliding operation in the X-direction and a sliding operation in the Y-direction while consciously differentiating between the two, different kinds of operation inputs can be made.

Figure 16:
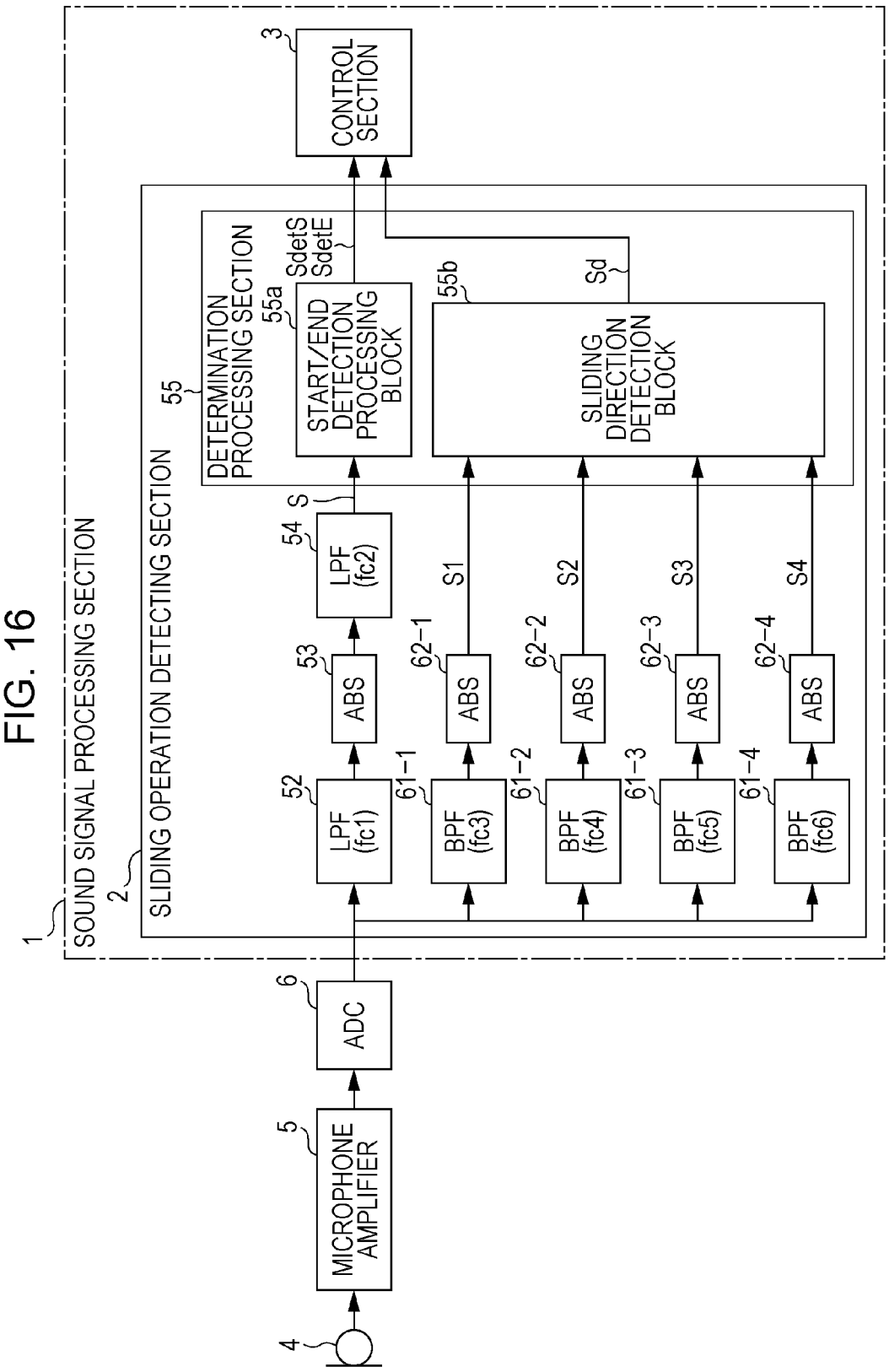
FIG. 16 is a block diagram of a sliding direction detection configuration according to an embodiment.

FIG. 16 shows an example of the configuration of the sound signal processing section 1 designed to detect the sliding direction, in particular, the configuration of the sliding operation detecting section 2 in the case where the directional sound source section 9 is provided in the vicinity of the microphone 4.

FIG. 16 shows the internal configuration of the sliding operation detecting section 2 in detail, out of the basic configuration shown in FIG. 1.

In this case, through a determination process using a sliding sound signal component produced by a sliding operation, the sliding operation detecting section 2 determines the start and end of the sliding operation, and further detects the direction of the sliding operation from an inputted sound signal.

Then, the control section 3 performs a predetermined control process that is set with respect to the sliding operation direction detected by the sliding operation detecting section, during the period from the start to end of the sliding operation determined by the sliding operation detecting section 2.

The sliding operation detecting section 2 includes the low-pass filter 52, the absolutizing circuit 53, the low-pass filter 54, and the determination processing section 55. These components may be considered to be the same as those described in Configuration Examples I, II, and III in the case of the NC headphone 10 described above.

That is, the low-pass filter 52 extracts a sliding sound signal component from the sound signal obtained with the microphone 4. Although a low-pass filter is assumed here, depending on the material or structure of the directional sound source section 9, there may be cases where it is suitable to use a band-pass filter.

This sliding sound signal component is absolutized in the absolutizing circuit 53, converted into an enveloped signal S with the low-pass filter 54, and supplied to the determination processing section 55.

The determination processing section 55 is provided with a start/end detection processing block 55a and a sliding direction detection block 55b.

The start/end detection processing block 55a determines the start and end of a sliding operation from the signal S, and outputs a sliding start detection signal SdetS and a sliding end detection signal SdetE to the control section 3 in accordance with this determination.

The sliding operation detecting section 2 is also provided with band-pass filters 61-1, 61-2, 61-3, and 61-4, and absolutizing circuits 62-1, 62-2, 62-3, and 62-4.

The pass-band center frequency of the band-pass filter 61-1 is set to fc3.

The pass-band center frequency of the band-pass filter 61-2 is set to fc4.

The pass-band center frequency of the band-pass filter 61-3 is set to fc5.

The pass-band center frequency of the band-pass filter 61-4 is set to fc6.

The absolutizing circuits 62-1, 62-2, 62-3, and 62-4 supplies signals S1, S2, S3, and S4 obtained by absolutizing the outputs of the band-pass filters 61-1, 61-2, 61-3, and 61-4, respectively, to the sliding direction detection block 55b in the determination processing section 55.

The sliding direction detection block 55b observes the characteristic based on the signals S1, S2, S3, and S4.

For example, in the sliding direction detection block 55b, the tendencies of frequency characteristics are preset for individual sliding directions. These are compared with the signals S1, S2, S3, and S4, and in the same manner as pattern recognition, the direction corresponding to the closest characteristic is determined as the sliding direction. Then, the sliding direction detection block 55b outputs a sliding direction determination signal Sd to the control section 3.

Figure 17:
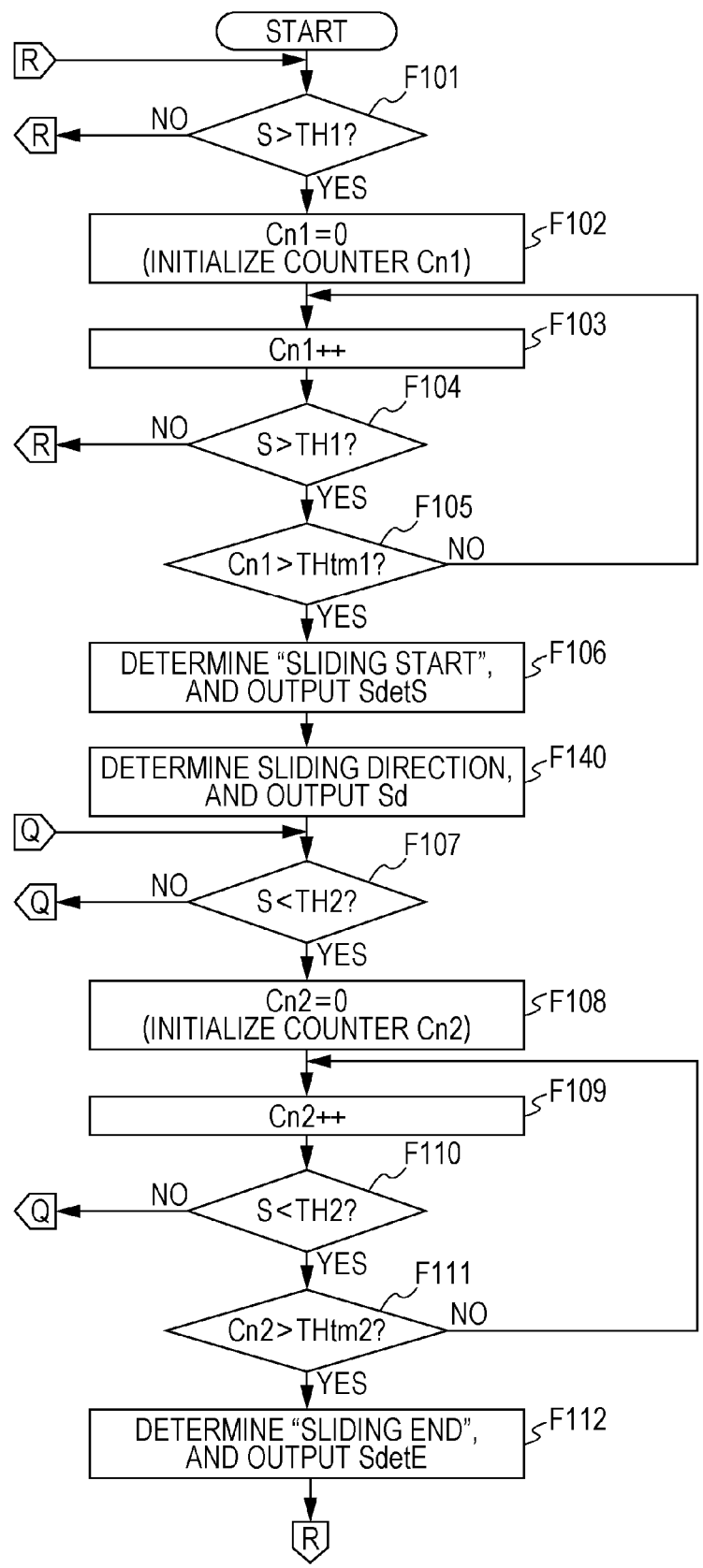
FIG. 17 is a flowchart of processing in the case of a sliding direction detection configuration according to an embodiment.

The processing in the determination processing section 55 including the start/end detection processing block 55a and the sliding direction detection block 55b is as shown in FIG. 17.

It should be noted that in FIG. 17, processes that are the same as those in FIG. 8 mentioned above are denoted by the same step numbers, and repetitive description is avoided.

In the processing shown in FIG. 17, in steps F101 to F106, as the processing on the start/end detection processing block 55a side, the start of a sliding operation is determined in the same manner as in the case of FIG. 8.

Then, if it is determined in step F106 that a sliding operation has been started, and a sliding start detection signal SdetS is outputted, as the processing on the sliding direction detection block 55b side, the determination processing section 55 determines the sliding direction and outputs a sliding direction determination signal Sd in step F140.

The sliding direction detection block 55b compares the signals S1 to S4 with the frequency characteristic patterns that are preset for individual sliding directions, and determines the sliding direction according to which pattern the frequency characteristic based on the current signals S1 to S4 is close to.

FIGS. 18A and 18B and FIGS. 19A and 19B each show an example of how to determine the sliding direction.

FIGS. 18A and 18B show frequency characteristics when sliding is performed in the forward and reverse directions, respectively, in the case where the directional sound source section 9 is in the form of a hook-and-loop fastener.

During sliding in the forward direction, frequency peaks indicated as Peak1 and Peak2 in FIG. 18A are observed. During sliding in the reverse direction, frequency peaks indicated as Peak3 and Peak4 in FIG. 18B are observed. The sliding direction is determined by, for example, exploiting such a difference in frequency characteristic according to the sliding direction.

Figures 19A, 19B:
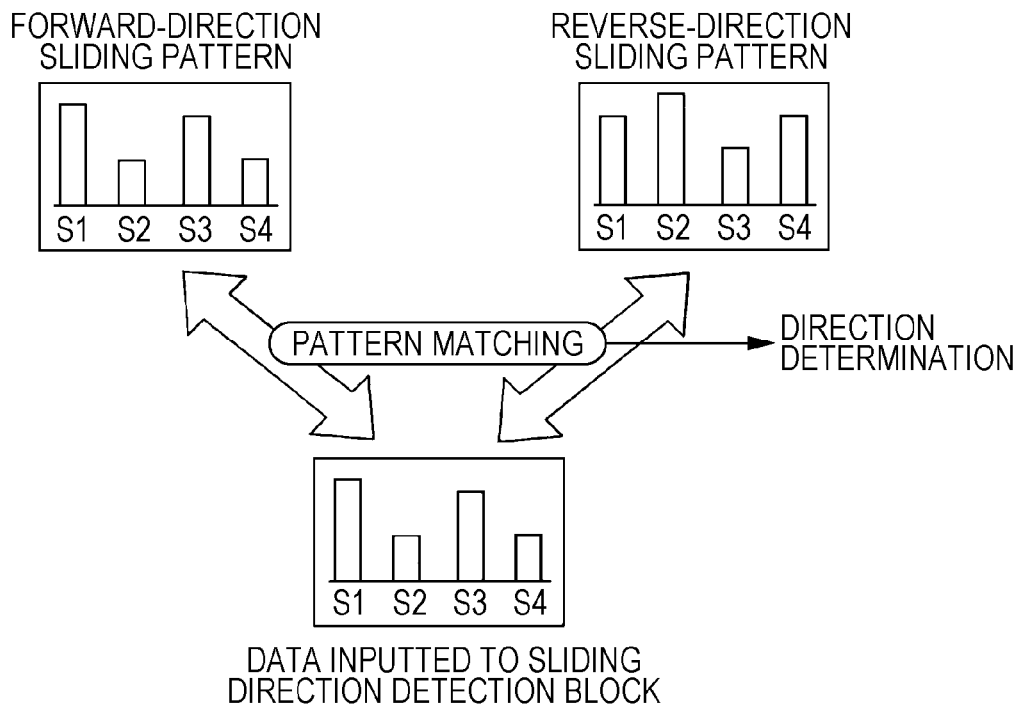
FIGS. 19A and 19B are each an explanatory diagram of sliding direction determination according to an embodiment.

FIGS. 19A and 19B schematically show a determination process.

As shown in FIG. 19A, it is supposed that the respective pass-band center frequencies fc3 to fc6 of the band-pass filters 61-1 to 61-4 are set to 50 Hz, 150 Hz, 3 KHz, and 7 KHz corresponding to Peak1 to Peak4 shown in FIGS. 18A and 18B mentioned above, respectively.

As illustrated as a forward-direction sliding model pattern in FIG. 19B, with respect to the signals S1 to S4, the frequency characteristic is such that Peak1 and Peak2 are observed during sliding in the forward direction.

Also, as illustrated as a reverse-direction sliding model pattern in FIG. 19B, with respect to the signals S1 to S4, the frequency characteristic is such that Peak3 and Peak4 are observed during sliding in the reverse direction.

In the sliding direction detection block 55b, model patterns corresponding to the signals S1 to S4 are preset in this way.

From the respective levels of the signals S1 to S4 that are inputted, to which model pattern the corresponding frequency characteristic is close to is determined by pattern matching. Then, the sliding direction is determined on the basis of the result.

For example, in the illustrated example, the frequency characteristic based on the inputted signals S1 to S4 is regarded as being close to the forward-direction sliding model pattern. Therefore, the sliding direction is determined to be the forward direction.

While this example discriminates between sliding in forward and reverse directions, the same applies also in the case of discriminating between the X-direction and the Y-direction.

Furthermore, as shown in FIG. 20A, the same applies also in the case of differentiating between sliding operations in the forward X-direction (X1), the reverse X-direction (X2), the forward Y-direction (Y1), and the reverse Y-direction (Y2). For example, as shown in FIG. 20B, individual frequency characteristic model patterns corresponding to the sliding directions X1, X2, Y1, and Y2 are prepared in advance. Then, by determining which model pattern the frequency characteristic obtained from the respective levels of the inputted signals S1 to S4 is close to, it is possible to discriminate between the sliding directions X1, X2, Y1, and Y2.

While in this example pattern matching is performed on the basis of four band levels using the four band-pass filters 61-1 to 61-4, this should not be construed restrictively. It goes without saying that in any case, it suffices as long as different frequency characteristics can be determined depending on the sliding direction.

For example, if it is apparent that a band A becomes a peak when the sliding direction is the forward direction, and that a band B becomes a peak when the sliding direction is the reverse direction, two band-pass filters for the bands A and B may be provided. Depending on the case, frequency characteristic matching may be performed by dividing the frequency characteristic into five or more bands with five or more band-pass filters.

In step F140 in FIG. 17, the sliding direction detection block 55b determines the sliding direction by, for example, the above-mentioned pattern matching method, and outputs a sliding direction determination signal Sd to the control section 3.

Therefore, when the start of a sliding operation is detected, through the processes in step F106 and F140, a sliding start detection signal SdetS and a sliding direction determination signal Sd are supplied to the control section 38.

Subsequently, the determination processing section 55 determines the end of the sliding operation in steps F107 to F111 in the same manner as in the case of FIG. 8.

Then, if it is determined that the sliding operation has been ended, the determination processing section 55 outputs a sliding end detection signal SdetE to the control section 38 in step F112.

As the sliding operation detecting section 2 performs the above-mentioned processing, on the basis of a sliding start detection signal SdetS, a sliding end detection signal SdetE, and a sliding direction determination signal Sd, the control section 38 can recognize a plurality of kinds of operation inputs in accordance with the sliding direction with respect to the microphone 4. Therefore, different control processes, for example, controls such as Volume Up/Down, can be performed in accordance with those operation inputs.

Therefore, two or more operation inputs can be made by a sliding operation on a single microphone 4.

Furthermore, when sliding operations on a plurality of microphones are differentiated from each other as in Configuration Examples II and III of the NC headphone 10 described above, it is possible to perform a greater variety of kinds of operations.

Also, if the sliding sound in each of the four directions as shown in FIG. 20A is independent as a specified axis, and a vector decomposition process is possible with respect to the sound, it is also possible to detect four or more directions (for example, sliding in the diagonally upward direction).

If it is possible to determine the X/Y direction, four directions, and further, multiple directions of sliding, it is also possible to use a sliding operation for a mouse operation or a pointing device. Also, it is also possible to use a sliding operation for a scroll operation.

<5. Embodiment in which a Sliding Guide and a Directional Sound Source Section are Provided>

FIGS. 21A and 21B each illustrate a case in which both the sliding guide 8 and the directional sound source section 9 are provided.

While FIGS. 21A and 21B also show examples of the personal computer 100 and headphone 200 as in FIGS. 2A and 2B, FIGS. 13A and 13B, and FIGS. 14A and 14B, respectively, in FIGS. 21A and 21B, the sliding guide 8 is formed as the directional sound source section 9.

For example, a projected (rail-like) sliding guide 8 is formed in a ring shape around the microphone 4. The material or structure of the sliding guide 8 is such that the direction sound source section 9 that produces different sounds in the forward and reverse directions.

As indicated by arrows R1 and R2, the user can make an operation input while differentiating between clockwise sliding and counter-clockwise sliding operations along the sliding guide 8.

In the case of the above configuration as well, the sliding operation detecting section 2 may be configured to determine the start/end of a sliding operation, and the sliding direction as in FIG. 17.

Then, the control section 3 can perform a control process according to the sliding direction. For example, such intuitive operations as would be used in ordinary AV equipment, including Volume Up/Down, and Advance/Return of channels or playback content, become possible for enhanced user convenience.

While this example is directed to the case of the ring-like sliding guide 8 that guides a rotary sliding operation, the sliding guide 8 may have a linear or bowed shape. Alternatively, the sliding guide 8 may have a ring shape or linear shape that is partially cut away. When each of such sliding guides 8 is formed as the directional sound source section 9, it is possible to make a plurality of kinds of operation inputs in accordance with the forward and reverse sliding directions along the sliding guide 8.

<6. Embodiment in which a Sliding Sound Source Section is Provided>

Next, a description will be given of a configuration in which a plurality of sliding sound source sections that produce different sound signal components at the time of a sliding operation are provided in the vicinity of the microphone 4.

Figure 22A:
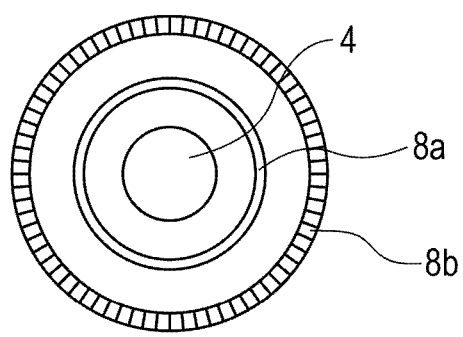
FIGS. 22A and 22B are each an explanatory diagram of a configuration including a plurality of sliding sound source sections according to an embodiment.

For example, FIG. 22A shows an example in which two ring-like sliding sound source sections 8*a* and 8*b* are provided around the microphone 4.

Figure 22B:
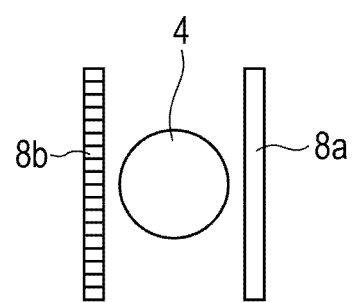

Also, FIG. 22B shows an example in which two linear sliding sound source sections 8*a* and 8*b* are provided near the microphone 4.

In both cases, the sliding sound source sections 8*a* and 8*b* differ in material and shape from each other, and produce different when sliding is performed.

In this case, the sliding operation detecting section 2 detects the location of a sliding operation from an input sound signal. That is, by a determination process using a sliding sound signal component produced by the sliding operation, the sliding operation detecting section 2 determines the start and end of the sliding operation, and further, detects the location where the sliding operation has been performed from the inputted sound signal.

Detecting the location where the sliding operation has been performed means determining on which of the sliding sound source sections 8*a* and 8*b* the sliding operation has been performed. Since the sliding sound source sections 8*a* and 8*b* produce different when sliding is performed, in this case as well, the configuration and processing as shown in FIG. 16 may be employed.

That is, the location of sliding can be determined by pattern matching of the frequency characteristics of sounds obtained with the respective sliding sound source sections 8*a* and 8*b*. Then, in accordance with determination of the start and end of the sliding operation, the sliding operation detecting section 2 outputs a sliding start detection signal SdetS and a sliding end detection signal SdetE to the control section 3, and also outputs a determination signal of the sliding location.

Since the control section 3 can recognize on which of the sliding sound source sections 8*a* and 8*b* the sliding operation has been performed from the determination signal of the sliding location, the control section 3 can perform a control process that differs in accordance with this recognition. For example, the control section 8 performs a control such as Volume up when the sliding sound source section 8*a* is operated, and Volume down when the sliding sound source section 8*b* is operated.

It is thus possible for the user to make a variety of operation inputs by selecting the location of sliding near the microphone 4.

It should be noted that such differentiation based on the sliding location, the above-described differentiation based on the sliding direction, and further, differentiation between a plurality of the microphones 4 may be combined to enable a variety of operation inputs.

<7. Embodiments Applied to Various Kinds of Equipment and Modifications>

While various embodiments have been described above, as described above, the present disclosure can be applied to a variety of electronic equipment. In the following, the configurations and advantages of the present disclosure as applied to specific electronic equipment, its modifications, and so on will be illustrated.

First, it is conceivable to install the sound signal processing section 1 (the sliding operation detecting section 2 and the control section 3) in the media player 20 shown in FIG. 4.

That is, the function of the noise cancellation unit 14 is built in the media player 20. In this case, the media player 20 is the specific apparatus installed with the sound signal processing section 1 according to an embodiment of the present disclosure, and can provide the same effect as that of the NC headphone 10 described above.

The microphone 4 in that case may be installed in a headphone apparatus being connected, or may be separate microphone equipment from a headphone apparatus connected to a microphone input terminal. Of course, if a microphone is built in the main body of the media player 20, that microphone may be used.

In the case of sound recording equipment such as an IC recorder, the microphone 4 is provided, so the configuration as shown in FIG. 1 can be easily implemented. In that case, it is conceivable to apply a sliding operation on the microphone 4 to an adjustment of the recording microphone level, or the like.

Also, many types of imaging equipment such as digital still cameras and video cameras also come installed with a microphone. Providing such imaging equipment with the configuration shown in FIG. 1 enables operation inputs to be made using a microphone.

For example, in the case of digital still cameras, it is conceivable to use a sliding operation to perform a scroll operation when playing back or searching for captured images. In the case of video cameras, for example, it is conceivable to use a sliding operation for, for example, doing a zoom on an object to be captured, or a camera zoom operation.

In the case of game machines, a sliding operation on the microphone 4 can be used to do an operation related to the game.

In the case of television receivers, a sliding operation on the microphone 4 can be used to do a scroll operation for channel selection, a volume control operation, or the like.

Likewise, the present disclosure is also applicable to a personal computer, a portable information processing apparatus (for example, a personal digital assistant (PDA)), a portable telephone, or the like.

In the case where a microphone for sound input is provided to these types of equipment, an operation input can be made by doing a sliding operation on the microphone. For example, by using a stereo microphone for communication installed in personal computers or mobile PCs, it is possible to recognize an operation by detecting a sliding operation, and perform a predetermined process. For example, it is conceivable to assign a sliding operation to a mouse operation, a pointing operation, a scroll operation, or the like.

In the case of portable telephones, a microphone is provided of course. Thus, by using this microphone, the present disclosure can be applied without the burden of installing a microphone device anew. For example, the present disclosure can be suitably applied to a scroll operation when searching through telephone numbers, addresses, the names of transmit destinations, and so on.

Furthermore, the present disclosure is also applicable to various kinds of communication apparatus, audio-visual (AV) equipment, consumer electronic equipment, and so on.

Also, as the kinds of operations that can be made by a sliding operation, a variety of examples are conceivable, such as an operation related to recording/playback, an operation related to transmission/reception, a menu control operation, an Enter operation, and a Power on/off operation.

Moreover, in many cases, a microphone is mounted in mobile equipment with high portability, such as NC headphones, media players, portable telephones, mobile PCs, and portable game machines. For this reason, it is advantageous to be able to obviate mounting of switches that occupy a large space.

It should be noted that since such equipment is compact, the resources of the CPU or DSP internally installed in the equipment are inevitably limited. From this background, it is desired that the detection algorithm be as computationally light as possible.

For this reason, the above-described algorithm according to an embodiment, which performs an energy determination process on the temporal axis and detects a sliding operation without performing a frequency analysis or the like, is more effective.

As for the kinds of operation given by a sliding operation, a variety of operations can be assigned by combining an intermittent sliding operation, the sliding operation interval, and the like, in addition to the differentiation regarding on which microphone a sliding operation is performed, the direction of sliding, the location of sliding, and the like described above.

Furthermore, in the case where the user performs a sliding operation with a finger, the sliding sound produced differs between when performing the sliding operation with the thick of the finger and when performing the sliding operation with the tip of the nail. That is, the frequency characteristic of the resulting sliding sound signal component differs. Thus, these two cases can be differentiated from each other by the sliding operation detecting section 2 when determining a sliding operation. Therefore, it is also conceivable to assign different operations depending on whether the sliding operation in question has been performed with the thick of the finger or the nail, thereby increasing the kinds of operations that can be made by a sliding operation.

As for the microphone, it is possible to not only employ a microphone used for another sound input function but also provide a microphone dedicated to sliding operation input. If a large number of microphones for operation input can be provided, many kinds of operation inputs can be made using the microphones.

The microphone used for the sliding operation may be either of a stereo microphone, a monophonic microphone, and a multi-channel microphone.

Incidentally, in the embodiments described above, the sliding operation detecting section 2, 37 outputs a sliding start detection signal SdetS and a sliding end detection signal SdetE. Those signals may take any such signal form that allows the control section 3, 38 to recognize the start and end of a sliding operation.

For example, the sliding start detection signal SdetS and the sliding end detection signal SdetE may each be a signal of H level pulse, or a pulse that rises to H level at the start of sliding and drops to L level at the end of sliding. That is, the pulse is such a pulse that continuously becomes H level during the sliding operation period. Of course, the pulse logic may be reversed.

Furthermore, the signal form may be such that high frequency pulses are repeatedly outputted during the sliding operation period.

<8. Program>

A program according to an embodiment of the present disclosure is a program for causing an arithmetic processing apparatus to execute a sliding operation detecting step and a controlling step.

The sliding operation detecting step determines the start and end of a sliding operation by a determination process using a sliding sound signal component in a sound signal collected by an integral or separately connected microphone. The sliding sound signal component is produced by the sliding operation on the microphone itself or its vicinity.

The controlling step performs a predetermined control process that is set with respect to the sliding operation, during the period from the start to the end of the sliding operation determined in the sliding operation detecting step.

The sound signal processing apparatus according to an embodiment of the present disclosure is implemented as the control section (arithmetic processing apparatus) in each of the various kinds of equipment described above operates on the basis of such a program. That is, the processes in FIGS. 3 and 8 (or FIG. 12, FIG. 17, or the like) are executed.

Such a program can be previously recorded on a HDD that serves as a recording medium built in equipment such as a personal computer, a ROM in a microcomputer having a CPU, a flash memory, or the like.

Alternatively, the program can be temporarily or permanently stored (recorded) on a removable recording medium such as a flexible disk, a compact disc read only memory (CD-ROM), a magnet optical (MO) disc, a DVD, a Blur-ray disc, a semiconductor memory, or a memory card. Such a removable medium can be provided as so-called packaged software.

Other than being installed into a personal computer or the like from a removable medium, the program can be also downloaded from a download site via a network such as a local area network (LAN) or the Internet.

According to an embodiment of the present disclosure, it is possible to recognize a continuous operation or such an operation for which an operation quantity can be specified, and perform the corresponding control, while using a microphone as an operation input device. Thus, as a continuous operation or an operation for which an operation quantity is specified, the user is able to perform an operation that is easy and intuitive, an operation with good response, and the like by using the microphone, thereby significantly improving usability.

Moreover, operations for which it is usually convenient to use a dial or a slide lever can be performed by using a microphone, which also suitably contributes to reduced equipment cost, simplified apparatus configuration, and the like.

The present disclosure contains subject matter related to that disclosed in Japanese Priority Patent Application JP 2010-125501 filed in the Japan Patent Office on Jun. 1, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A sound signal processing apparatus comprising:
   a sliding operation detecting section to which a sound signal collected by a microphone is inputted, and which determines start and end of a sliding operation by a determination process using a sliding sound signal component in the inputted sound signal, the sliding sound signal component being produced by the sliding operation on the microphone itself or its vicinity; and
   a control section that performs a predetermined control process that is set with respect to the sliding operation, during a period from the start to the end of the sliding operation determined by the sliding operation detecting section;
   wherein as the determination process, the sliding operation detecting section determines that the sliding operation has been started, when a time during which an energy level of the sliding sound signal component is equal to or higher than a first level has continued for a first time or more; and
   wherein as the determination process, the sliding operation detecting section determines that the sliding operation has been ended, when a time during which the energy level of the sliding sound signal component is lower than a second level has continued for a second time or more.

2. The sound signal processing apparatus according to claim 1, wherein the sliding operation detecting section performs the determination process by using a sliding sound signal component produced by a rotary sliding motion on the microphone itself or its vicinity with a finger or a sliding tool.

3. The sound signal processing apparatus according to claim 1, wherein:
   a plurality of channels of sound signals are inputted to the sliding operation detecting section; and
   the sliding operation detecting section performs the determination process with respect to a sound signal obtained by adding the plurality of channels of sound signals to each other.

4. The sound signal processing apparatus according to claim 1, wherein:
   a plurality of channels of sound signals are inputted to the sliding operation detecting section; and
   the sliding operation detecting section performs the determination process with respect to each of the plurality of channels of sound signals, and determines the start and end of the sliding operation with respect to each of the channels.

5. The sound signal processing apparatus according to claim 1, wherein:
   a plurality of channels of sound signals are inputted to the sliding operation detecting section; and
   the sliding operation detecting section determines the start and the end of the sliding operation, and determines a channel on which the sliding operation has been performed, by performing a channel determination process which determines a channel that contains a sliding signal component from among the plurality of channels of sound signals, and the determination process with respect to a signal obtained by adding or subtracting sliding sound signal components from the plurality of channels to or from each other.

6. The sound signal processing apparatus according to claim 1, wherein:
   the sliding operation detecting section further detects a sliding operation direction from the inputted sound signal; and
   the control section performs a predetermined control process that is set with respect to the sliding operation direction detected by the sliding operation detecting section, during the period from the start to the end of the sliding operation determined by the sliding operation detecting section.

7. The sound signal processing apparatus according to claim 1, wherein:

the sliding operation detecting section further detects a sliding operation location from the inputted sound signal; and the control section performs a predetermined control process that is set with respect to the sliding operation location detected by the sliding operation detecting section, during the period from the start to the end of the sliding operation determined by the sliding operation detecting section.

8. The sound signal processing apparatus according to claim 1, further comprising:

a microphone, wherein a sound signal collected by the microphone is inputted to the sliding operation detecting section.

* * * * *